(12) United States Patent
Mate et al.

(10) Patent No.: US 10,137,485 B2
(45) Date of Patent: Nov. 27, 2018

(54) INTEGRATED WORKPIECE POSITIONING SYSTEM WITH INTEGRAL FUME EXTRACTION SYSTEM

(71) Applicant: LINCOLN GLOBAL, INC., City of Industry, CA (US)

(72) Inventors: David Mate, Thompson, OH (US); Christopher David Agosti, S. Euclid, OH (US); Andrew Caldarone, Mentor, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 901 days.

(21) Appl. No.: 14/590,556

(22) Filed: Jan. 6, 2015

(65) Prior Publication Data
US 2016/0193635 A1 Jul. 7, 2016

(51) Int. Cl.
| | |
|---|---|
| *F24F 9/00* | (2006.01) |
| *B08B 15/02* | (2006.01) |
| *B23K 37/04* | (2006.01) |
| *B23Q 1/66* | (2006.01) |
| *B23Q 11/00* | (2006.01) |

(52) U.S. Cl.
CPC .......... *B08B 15/02* (2013.01); *B23K 37/0461* (2013.01); *B23Q 1/66* (2013.01); *B23Q 11/0046* (2013.01)

(58) Field of Classification Search
CPC ....................................................... B08B 15/02
USPC .................................... 454/188–189, 61, 63
See application file for complete search history.

(56) References Cited

U.S. PATENT DOCUMENTS

| | | | | |
|---|---|---|---|---|
| 2,590,577 A | * | 3/1952 | Ruemelin | B23K 9/32 312/280 |
| 3,894,480 A | * | 7/1975 | Birdsall | B01L 9/02 454/49 |
| 5,045,668 A | * | 9/1991 | Neiheisel | B23K 26/032 219/121.63 |
| 5,350,337 A | * | 9/1994 | Kondo | F24F 9/00 454/189 |
| 5,851,143 A | * | 12/1998 | Hamid | G01N 17/002 454/57 |
| 6,165,410 A | | 12/2000 | Crees et al. | |

(Continued)

FOREIGN PATENT DOCUMENTS

| | | |
|---|---|---|
| DE | 19521110 A1 | 1/1996 |
| DE | 10334677 B3 | 11/2004 |

(Continued)

*Primary Examiner* — Vivek Shirsat

(57) ABSTRACT

A workpiece positioning system integrated with a fume extraction device, the system including a movable work surface assembly including at least one work surface; at least one divider extending upward from the at least one work surface dividing the at least one work surface into a plurality of work zones in which a welding operation is performed, the divider including a collection assembly comprising a first ventilation port on a first side of the divider opening toward a first work zone of the plurality of work zones and a second ventilation port on a second side of the divider opening toward a second work zone of the plurality of work zones formed by the divider; wherein at least one of the first and second ventilation ports are selectively placed in fluid communication with the fume extraction device to draw fume from at least one of the plurality of work zones.

24 Claims, 17 Drawing Sheets

(56) References Cited

U.S. PATENT DOCUMENTS

| | | | |
|---|---|---|---|
| 9,889,531 B2* | 2/2018 | Agosti | B23Q 11/0078 |
| 2003/0080096 A1 | 5/2003 | Yamaguchi et al. | |
| 2008/0282500 A1* | 11/2008 | Omagari | B08B 5/02 15/415.1 |
| 2010/0323600 A1* | 12/2010 | Tanaka | B08B 15/02 454/66 |
| 2015/0017898 A1 | 1/2015 | Agosti et al. | |

FOREIGN PATENT DOCUMENTS

| | | |
|---|---|---|
| EP | 0824992 A1 | 2/1998 |
| JP | 2003-164988 A | 6/2003 |

* cited by examiner

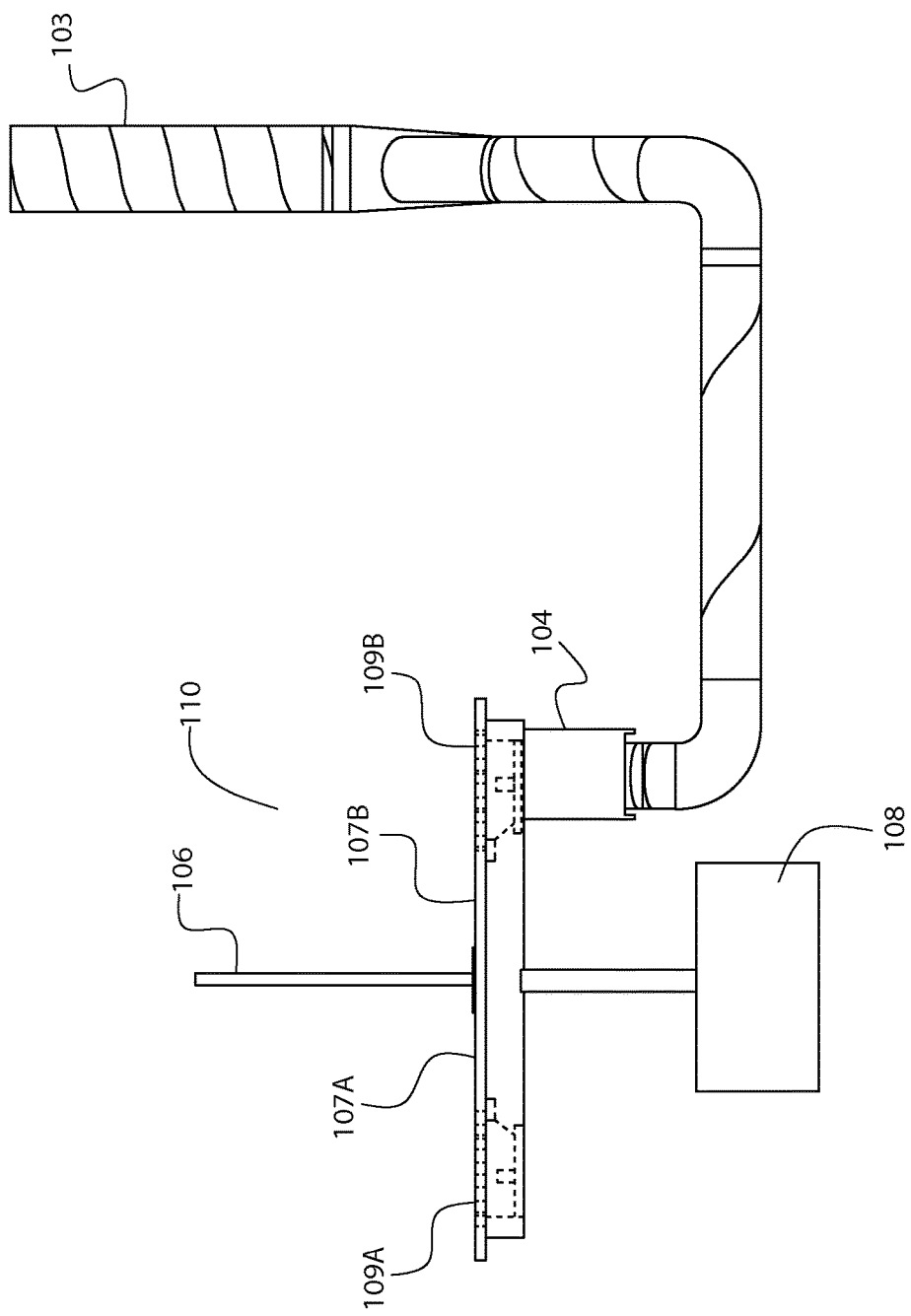

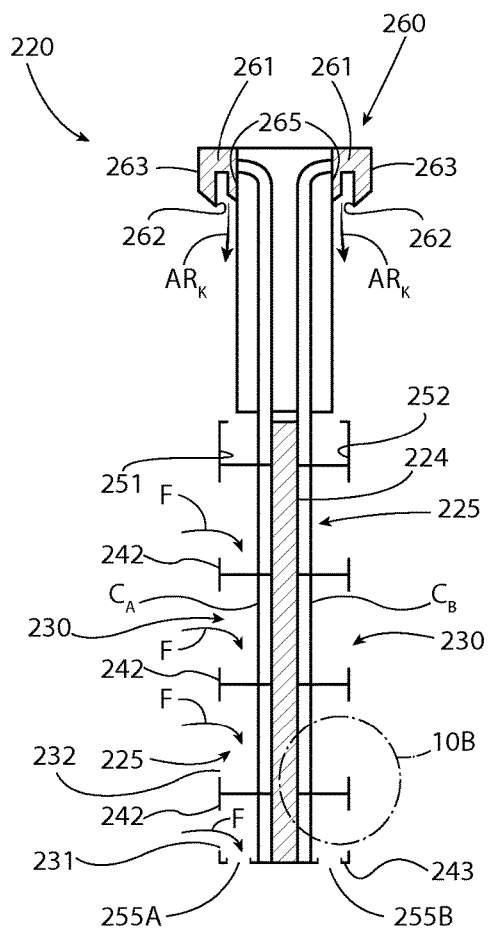
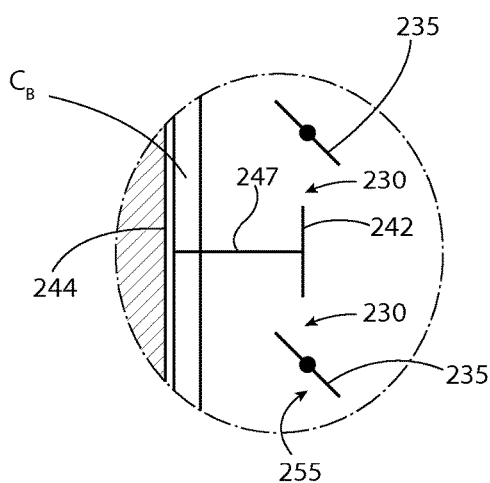
FIG. 10B
FIG. 10A

INTEGRATED WORKPIECE POSITIONING SYSTEM WITH INTEGRAL FUME EXTRACTION SYSTEM

TECHNICAL FIELD

The present invention relates to welding and cutting, and more specifically to welding and cutting systems using a workpiece positioning system with integral fume extraction.

BRIEF SUMMARY OF THE INVENTION

An exemplary embodiment of the present invention is a workpiece positioning system with an integral fume extraction system. The positioning system includes a movable assembly that has a plurality of separate work zones, each capable of holding a workpiece, where each work zone has a work surface and a ventilation port. The ventilation ports in each work zone are positioned consistently so that the assembly can be moved or rotated to position each ventilation port over a stationary ventilation manifold or system so that ventilation can be provided for the workpiece during a cutting or welding operation. During operation the assembly is moved to position each respective ventilation port over the stationary ventilation system in a consistent and repeated fashion to allow for adequate work piece ventilation and increased productivity.

Another embodiment of the present invention is a workpiece positioning system that includes a movable work surface assembly having a plurality of work zones. The workpiece positioning system is, for example, integrated with a fume extraction device. The work surface assembly includes a plurality of work surfaces and a plurality of ventilation ports. Workpieces to be welded or cut are to be placed on the plurality of work surfaces. Each of the plurality of ventilation ports is disposed on each of the plurality of work surfaces to ventilate a corresponding work zone. In some exemplary embodiments, the workpiece positioning system further includes a manifold disposed below the work surface assembly. The manifold is preferably coupled to a duct system through which fumes produced during welding or cutting are to be transported to the fume extraction device. When a workpiece placed on a first work surface of the plurality of work surfaces is positioned for welding or cutting, the manifold is aligned and in fluid communication with a first ventilation port corresponding to the first work surface of the plurality of work surfaces.

A workpiece positioning system integrated with a fume extraction device, the system including a rotatably movable work surface assembly including at least one work surface; at least one divider extending upward from the at least one work surface dividing the at least one work surface into a plurality of work zones in which a welding operation is performed, the divider including a collection assembly comprising a first ventilation port on a first side of the divider opening toward a first work zone of the plurality of work zones and a second ventilation port on a second side of the divider opening toward a second work zone of the plurality of work zones formed by the divider; wherein at least one of the first and second ventilation ports are selectively placed in fluid communication with the fume extraction device to draw fume from at least one of the plurality of work zones.

A workpiece positioning system integrated with a fume extraction device, the system including a movable work surface assembly having a divider that defines a plurality of work zones, the work surface assembly including a plurality of work surfaces on which workpieces are placed for a welding operation, a plurality of ventilation ports, each of the plurality of ventilation ports disposed adjacent to the plurality of work surfaces and selectively connected to the fume extraction device to ventilate a corresponding work zone; and an air knife assembly supported on the divider, the air knife assembly including at least one air knife including an outlet in fluid communication with an air supply, the at least one outlet being oriented to direct fluid over at least one of the work zones.

BRIEF DESCRIPTION OF THE DRAWINGS

The above and/or other aspects of the invention will be more apparent by describing in detail exemplary embodiments of the invention with reference to the accompanying drawings, in which:

FIG. 4 illustrates a side view of the embodiment shown in FIG. 1;

FIG. 10A is a sectional view as might be seen along line 10A-10A in FIG. 10;

FIG. 10B is an enlarged view of the area indicated in FIG. 10A.

DETAILED DESCRIPTION

Figure 1:
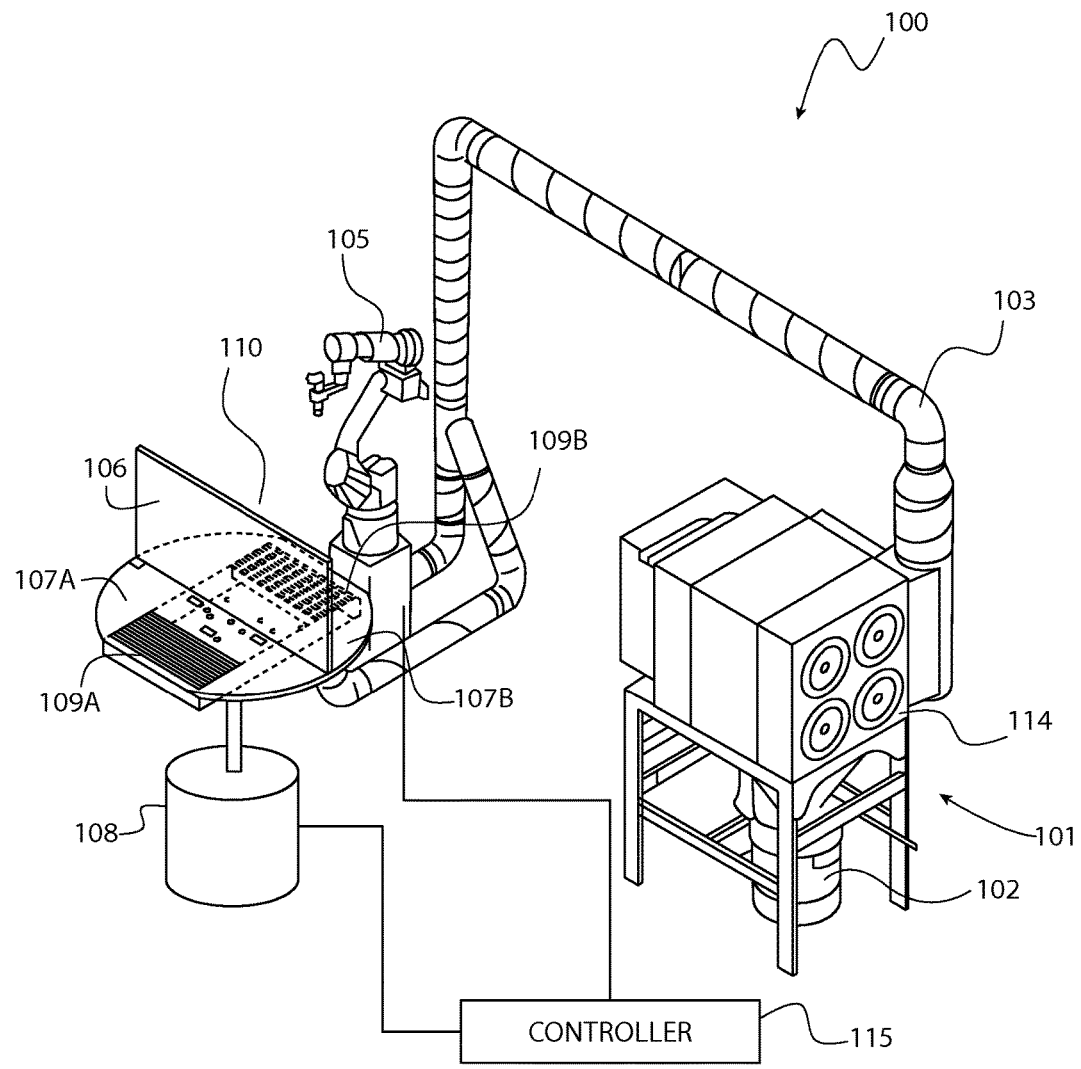
FIG. 1 illustrates an exemplary embodiment of an integrated fume extraction system in accordance with an exemplary embodiment of the present invention.
Figure 2:
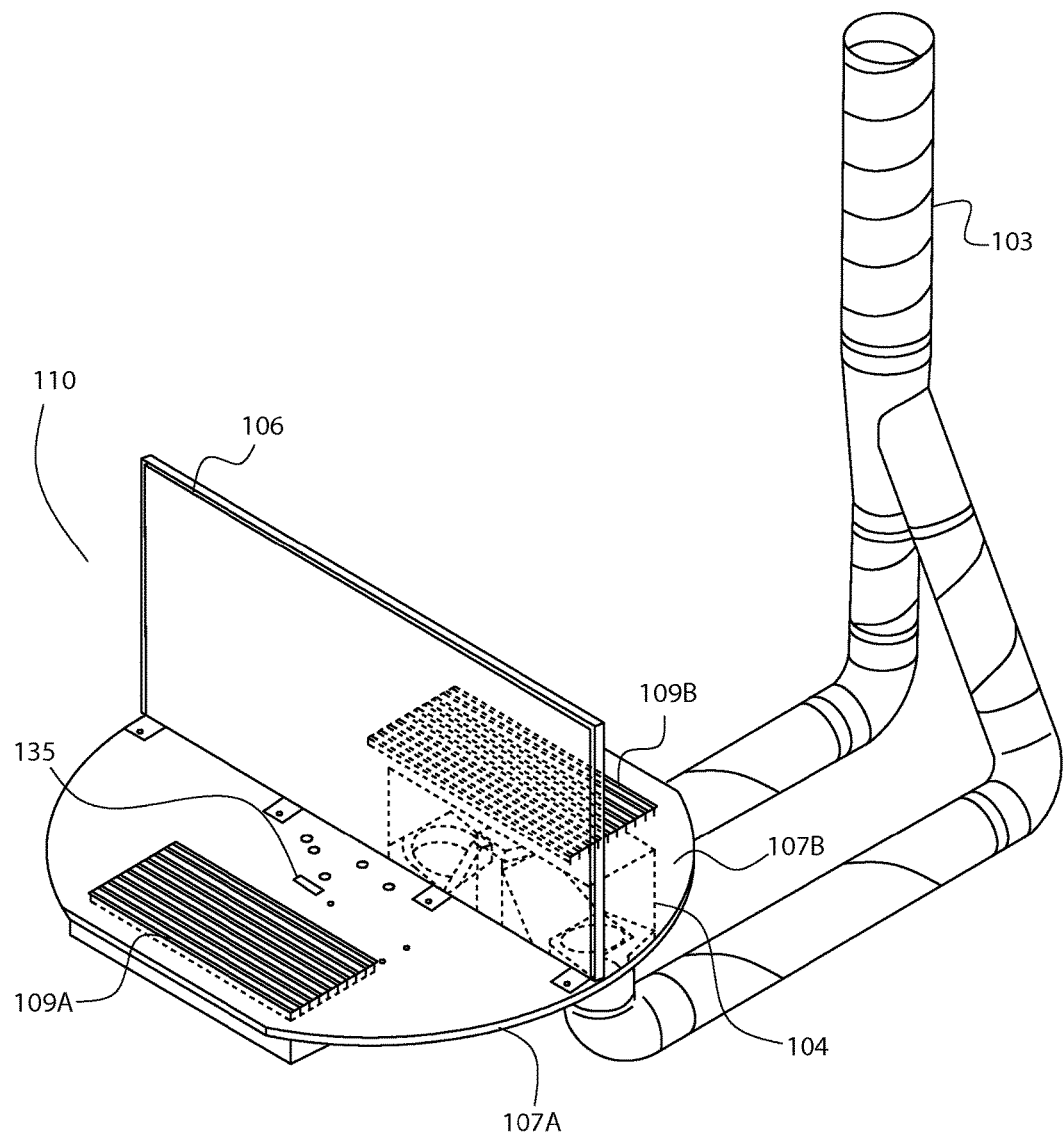
FIG. 2 illustrates a further view of the embodiment shown in FIG. 1.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIGS. 1-4 illustrate a diagrammatical representation of a workpiece positioning system 100 in accordance with an exemplary embodiment of the present invention. The workpiece positioning system 100 generally includes a supporting surface or fixture on which the workpiece is secured. The workpiece is secured in anticipation of a machining or assembly operation that includes welding, cutting, brazing, or soldering or any other operation that may result in the creation of a fume. For sake of simplicity, these operations will be collectively referred to as a welding operation herein. A fume includes the release or creation of any smoke, undesirable gas, or airborne particulate created during the welding operation. In general, an implement I is used to perform the welding operation within a work zone WZ encompassing the work piece W. Implement I may be any tool suitable for the particular welding operation including but not limited to a welding torch, plasma cutter, laser welder or cutter, soldering iron, brazing torch, cladding torch, hardfacing torch and the like. The system 100 can be used in any robotic, semi-automatic or manual welding operation.

According to the invention, the system includes an integrated fume extraction system. The system 100 utilizes a fume extraction device 101 which typically includes an extraction motor and may include at least one filter 114. The extraction motor draws air through a duct system 103 from the workpiece area during a welding or cutting operation. The filter 114 is used to scrub the extracted air and remove any undesirable particulate and chemicals from the drawn air flow. The structure and operation of fume extraction devices 101 are generally known and as such their structure and operation will not be described in detail herein. The system 100 can also include a robot 105 to perform a desired welding or cutting operation. In other exemplary embodiments a semi-automatic or manual welding torch can be utilized without departing from the spirit or scope of the present invention.

As shown in FIGS. 1-4, the system 100 also includes a work surface assembly 110 upon which workpieces are placed to be welded or cut. The assembly 110 is a movable assembly such that it can position multiple workpieces in front of the robot 105 for a welding or cutting operation. In the embodiment depicted in the figures the assembly 110 is a rotatable assembly which pivots about a center point to position multiple workpieces in front of the robot 105. The assembly 110 is rotated by a motor 108. In an exemplary embodiment of the present invention, the motor 108 and the robot 105 are controlled by a controller 115 which controls the rotation of the assembly 110 and the movement of the robot 105. That is, the controller 115 causes the assembly 110 to rotatably move by an appropriate rotational distance to position a workpiece to be welded or cut by the robot 105.

The assembly 110 depicted is divided into multiple work zones (two shown) where the first work zone has a first work surface 107A and the second work zone has a second work surface 107B, each of which can support, separately, a workpiece for a welding or cutting operation. The work zones are separated by a divider 106 which provides protection between the two work zones. As shown, the divider 106 may be centered between work zones. Alternatively, the divider 106 may unequally divide the work zones to form work zones of different sizes relative to each other. The divider 106 shields each respective work zone to prevent debris from traveling from one zone to the other and to shield a user from the welding operation. In each of the respective work surfaces 107A/B is a ventilation port (see 109A and 109B, respectively). The ventilation ports 109A/B are oriented and positioned similar in each respective surface 107A/B so that when the assembly 110 is in an appropriate position one of the ports 109A/B is positioned over, and in fluid engagement with, a manifold 104 coupled to the duct system 103. This fluid engagement allows a downdraft ventilation effect to be achieved when the extraction device 101 is operating. That is, the fluid engagement relationship between the port 109A/B and the manifold 104 allows for efficient air flow down through the port 109A/B into the manifold 104 disposed below and proximate to the port 109A/B so that the air from the work zone can be ventilated adequately. Once a cutting or welding operation is completed on one side of the assembly 110, the assembly 110 is rotated 180 degrees so that the other of the work surfaces 107A/B and ports 109A/B is positioned in fluid engagement with the manifold 104 to allow for proper ventilation again, as described above. The ports 109A/B are positioned such that a geometric center of the ports 109A/B, respectively, are substantially aligned with a geometric center of the manifold 104 (at its upper opening) when each of the surfaces 107A/B is positioned in their respective work position. With such a configuration, the ventilation flow remains effective and consistent regardless of which work zone is being utilized. Further, in exemplary embodiments of the present invention the size and shape of the ports 109A/B are similar, in size and shape, to the upper opening of the manifold 104 at the assembly 110. In some exemplary embodiments the size of the ports 109A/B can be slightly larger than the opening of the manifold. However, the size and shape of the ports 109A/B can vary without departing from the spirit or scope of the invention, including shapes that are the same, larger, or smaller than the manifold 104.

It should be noted that each of the work surfaces 107A/B can have other holes, openings, ports, protrusions, etc. that aid a user in work piece positioning during use of the assembly 110. Specifically, the surfaces 107A/B can have one or more guides 135 that allow for a user to repeatedly place a work piece in the same position and orientation so that the robot 105 can consistently and properly perform a desired operation.

For example, during operation a user can place a first workpiece on the surface 107A, using the guides 135 on the surface 107A. In exemplary embodiments, the guides 135 would position the majority of the workpiece, or at least center the workpiece, over the port 109A. The assembly 110 is rotated 180 degrees by the motor 108, which is controlled by the controller 115 (the assembly can also be rotated by manual control), to position the workpiece in front of the robot 105 (or other type of implement I for performing a welding operation). After rotation, the port 109A is aligned with, and in fluid engagement with (allowing for the flow of air through the port 109A and the manifold 104), the manifold 104 so that air from the work zone can be ventilated. Then either before, during, or after the robot 105 completes its operation the user can place a second workpiece on the other surface 107B of the second work zone. If the second workpiece is of the same kind as the first workpiece, the user may use the same guides 135, etc. on the surface 107B to position the workpiece properly. The divider 106 protects the user sufficiently that the user can stand on the opposite side of the robot 105 (or whatever device is being used) during operation without being harmed by the cutting or welding operation. When the welding or cutting operation on the first workpiece is completed and the second workpiece (to be worked on) is positioned, the assembly 110 is turned 180 degrees and the operation is conducted on the second workpiece as desired. The user can then remove the completed first workpiece and replace it with a third workpiece, and the process can be repeated as desired.

The controller 115/motor 108 can control the rotation/movement of the assembly 110 in an automated fashion, in which the motor 108 rotates after a set duration of time, or in a non-automated fashion, in which the motor 108 waits for a user input to initiate the movement/rotation operation.

In the depicted exemplary embodiment, the assembly 110 is symmetrical along a centerline (represented by the divider 106 in FIG. 1). That is, each of the surfaces 107A/B is substantially the same in size, dimensions, and orientation, and each of the ports 109A/B is substantially the same in size, dimensions, and orientation. This symmetry allows for consistent and repeatable work on workpieces as well as ensuring proper fluid engagement between the ports 109A/B and the manifold 104 in each work position. This ensures optimal ventilation flow in each work position of the assembly 110. It is noted that in some exemplary embodiments, the surfaces 107A/B need not be exactly the same as they can have different guides, protrusions, shape, etc. as desired for various workpiece positioning, orientation, etc. However, the surfaces 107A/B and ports 109A/B should have sufficient symmetry to ensure that the assembly 110 can properly be moved and to ensure that the ports 109A/B be properly positioned in fluid engagement with the manifold 104 when the respective zone is in position to be worked on by the robot 105, etc. Alternate arrangements with non-symmetrical arrangements of the two work zones or work zones of unequal size when two or more zones are within the scope of the invention.

Thus, due to the novel features of exemplary embodiments of the present invention, as described above, a user can achieve the advantages of a movable work surface, while at the same time having effective and efficient work zone ventilation without requiring multiple ventilation systems, or without requiring larger overhead ventilation systems.

It should be noted that the exemplary embodiment depicted in the figures is intended to be exemplary, and other embodiments are contemplated without departing from the spirit or scope of the invention. For example, it is contemplated that embodiments can have more than two work zones as shown in the figures. For example, the assembly can have three or four work zones, where the assembly 110 is again essentially symmetrical. For example, it may be desirable for a workpiece to have additional cool down time after a welding or cutting operation. With three or four (or more) work zones, a workpiece will have an intermittent stop between its welding or cutting operation, and being removed by the user. This allows for additional workpiece cooling, and can also increase workpiece productivity. In each of these embodiments the assembly 110 should be symmetrical such that the geometry of each of the respective work zones (regardless of the number) have substantially the same geometry. For example, if there are three zones each occupies approximately 33.3% of the work surface of the assembly 110, and if there are four each occupies approximately 25%. Of course, in some embodiments, it may be desirable to have asymmetric work zones which do not have the same work zone area. However, in such embodiments, the ports 109A/B should be consistently placed so that regardless of which work zone is positioned in the work area (e.g., at the robot 105) the ports are properly aligned with the manifold 104 so that proper ventilation can be achieved.

Further, although the discussion herein is primarily directed to an assembly 110 which is rotated to present the work zones to the robot 105, other embodiments are not limited in this way. Specifically, embodiments of the present invention can also use other types of movement to position a work zone—and thus a ventilation port, to the desired work station area. For example, in other exemplary embodiments, a conveyor system can be used where each work surface on the conveyor has a ventilation port positioned in a consistent position such that when each conveyor zone is positioned in front of the robot the ventilation port and the manifold for the ventilation system will be aligned and in fluid engagement with each other. Thus, embodiments of the present invention are not limited to rotational movement only.

It should also be noted that embodiments of the present invention can be used in robotic, semi-automatic welding cells and can have wall structures (not shown) placed around them for added protection.

In the exemplary embodiment shown in FIGS. 1-4, the work surface is divided into individual work surfaces 107A, 107B by the center divider 106. However, in other embodiments, a plurality of work surfaces (or work zones) may be provided without the need of a divider. For example, for a fully enclosed robotic welding system, a divider may not be required or needed to provide a plurality of work surfaces (or work zones).

Figure 3:
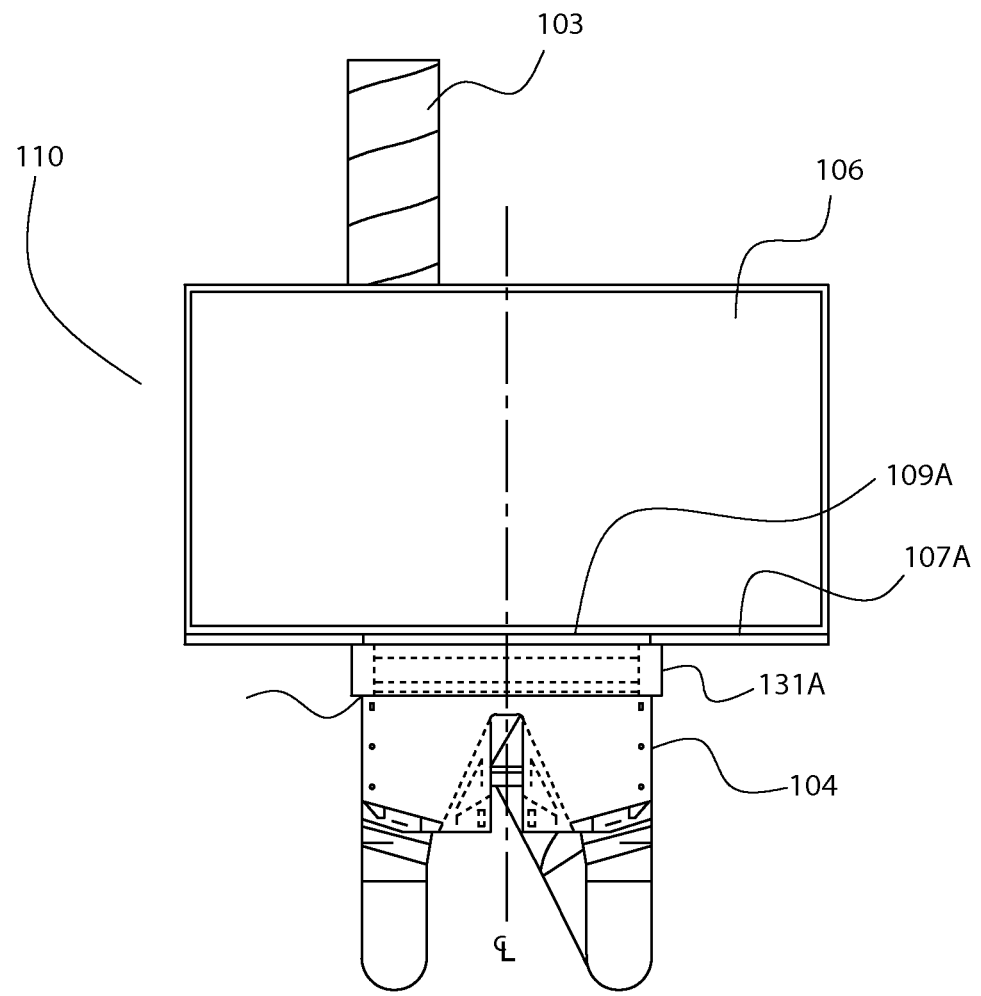
FIG. 3 illustrates an additional view of the embodiment shown in FIG. 1.

As explained above, the assembly 110 is constructed such that each of the ports 109A/B is positionable in fluid engagement with a single stationary manifold 104 which allows for repeated movement of the assembly 110, but allows for adequate ventilation for each work zone of the assembly 110. However, the assembly 110 is to also be freely movable so as to minimize the need for user interaction for the assembly 110 to move to its respective positions. Thus, in exemplary embodiments of the present invention, a gap G (FIG. 3) exists between a bottom edge of the ports 109A/B and the top edge of the manifold 104. The gap G is typically large enough to allow for free movement of the assembly 110 but also small enough to ensure sufficient ventilation through the ports 109A/B. If the gap G is too large too much air flow can be drawn through the gap, as opposed to the ports 109A/B, thus diminishing effective ventilation. In exemplary embodiments of the present invention, the maximum distance for the gap G around the perimeter of the manifold 104 is in the range of 0.1 to 0.5 inch. In other exemplary embodiments, the maximum distance of the gap is in the range of 0.1875 to 0.25 inch. As shown in FIGS. 3 and 5B, a port extension portion 131A/131B can be attached to the assembly which extends below (or away from) the work surfaces 107A/B and aids in providing the desired fluid engagement between the ports 109A/B and the manifold 104.

However, in some embodiments, the gap G described above may not exist between a bottom edge of the ports 109A/B and the top edge of the manifold 104. For example, a constant contact sliding joint (not shown) may be utilized without the need of the gap G. For specific example, the lower side of the extension portion 131A/B includes a wide flat surface and the manifold 104 also includes a wide flat flange such that the two opposing surfaces are approximately parallel to and in contact with each other. When properly lubricated, this contact sliding joint configuration requires no physical gap at the interface, thus promoting optimal or maximum suction at the ventilation port opening. In other examples, the size and shape of the sliding contact joint may vary without departing from the scope of the invention, including concentric and tangential sliding contact joint configurations.

Figure 5A:
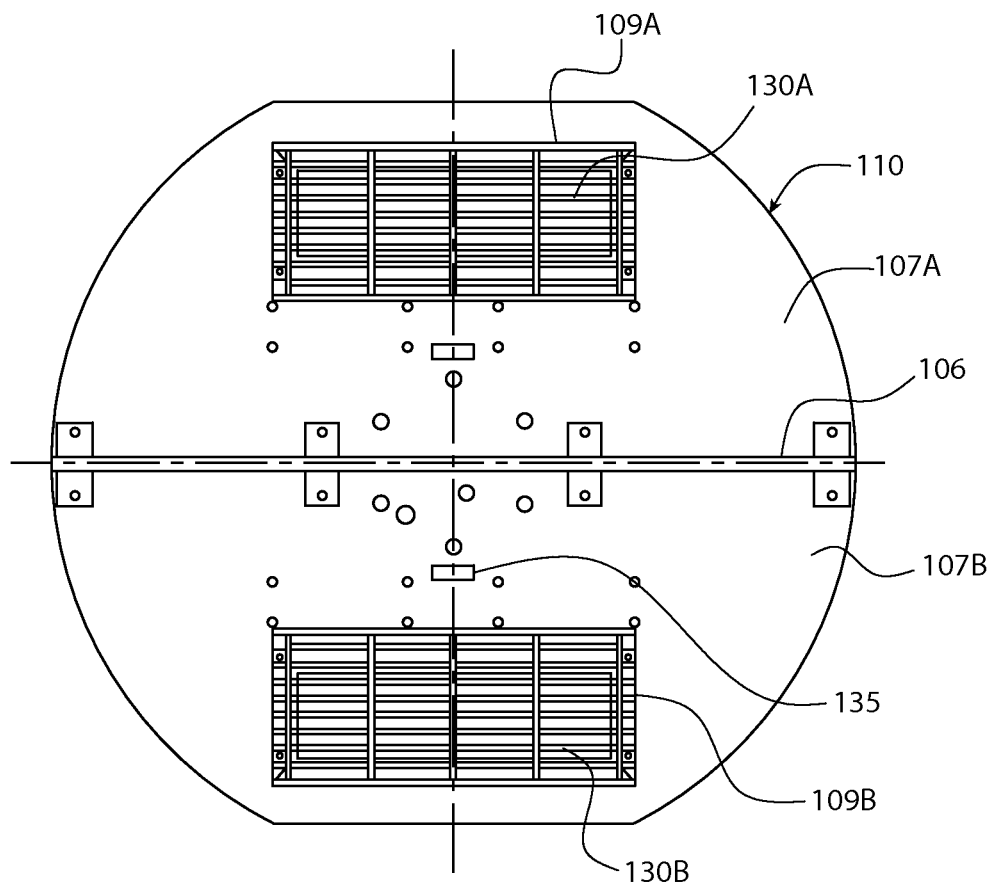
FIGS. 5A and 5B illustrate exemplary embodiments of a workpiece surface utilized in exemplary embodiments of the present invention.
Figure 5B:
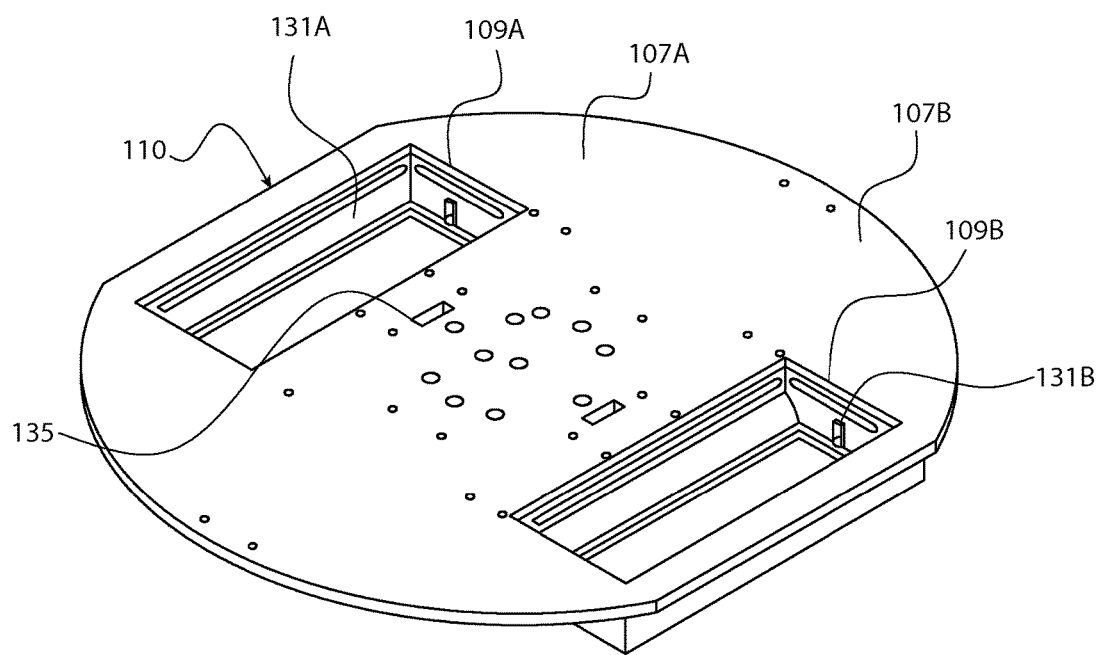

FIG. 5A depicts an exemplary embodiment of the assembly 110 having two work zones with surfaces 107A/B and two ports 109A/B as described above. As shown, each port 109A/B also utilizes a support vent structure 130A/B, respectively. The support vent structure 130A/B is a rigid structure that sits flush with the surfaces 107A/B, respectively, not only to support a workpiece but also to allow for downward ventilation when the ports 109A/B are positioned over the manifold 104. The support vent structure 130A/B can be constructed from any known material and configuration to ensure proper workpiece placement and adequate ventilation. The support vent structure 130A/B may be a grate-like structure as shown in FIG. 5A such that undesirable foreign items are prevented from entering into the ventilation system 100. In some exemplary embodiments, the support vent structures 130A/B may not be fixedly secured to the assembly 110 (such as with fasteners, etc.) but can merely be a "drop in" or "clip in" type. In such embodiments, the support vent structure 130A/B can be easily replaced or changed out as needed, as it may be desirable to change support vent structure depending on the workpieces. FIG. 5B depicts the work zones, surfaces 107A/B, ports 109A/B and extensions 131A/B of the assembly 110 without the divider 106 and support vent structures 130A/B. Also shown are exemplary workpiece holes or guides 135 that were described earlier.

In addition to the guides 135, etc. on the surfaces 107A/B, other exemplary embodiments can use contact switches or contact sensors on the surfaces 107A/B to indicate when a workpiece is properly positioned on the surfaces 107A/B to control movement of the assembly 110. As described previously, in some embodiments a user can indicate to the controller 115 when movement of the assembly 110 is desired. In such embodiments, the user would indicate that a workpiece has been properly placed on a surface 107A/B thus indicating that the user is ready for movement of the assembly 110. In exemplary embodiments, the controller 115 would then wait until the robot 105 completes its operation before moving the assembly 110. This prevents premature movement of the assembly 110. Thus, the controller 115 waits for at least two events—welding/cutting completion and workpiece installation—before moving the assembly 110. The signal indicating completion of welding/cutting can also come from a user in a manual or semi-automatic welding operation. However, in other exemplary embodiments, contact switches, pressure switches, sensors, etc. can be positioned on each of the surfaces 107A/107B that engage with a workpiece when the workpiece is properly positioned. Thus, when a workpiece is properly positioned the appropriate sensors/switches are engaged and a signal is provided to the controller 115 to indicate that the workpiece is positioned properly, and the controller 115 does not move the assembly 110 until the appropriate sensors/switches are engaged. In some embodiments, a plurality of contact switches can be used in specific locations such that the controller 115 will not allow movement until each contact switch is all engaged. In other embodiments, at least one pressure switch can be utilized which senses an amount of pressure or weight and the controller 115 will allow to move the assembly 110 only when the appropriate amount of weight/pressure is detected. Various other sensor/switch configurations can be used without departing from the spirit or scope of the present invention. In other exemplary embodiments, non-contact switches and/or sensors can be used. For example, optical and/or magnetic sensors can be used to sense the positioning and placement of the workpieces to control the movement of the assembly 110, by the controller 115, as described above. Further, in other exemplary embodiments, at least two contact points can be utilized such that when a workpiece is positioned properly the workpiece completes an electrical circuit for a sensing current that is passed through the workpiece, thus indicating to the controller that the workpiece is in place properly. In such embodiments, the sensing current is turned off prior to the welding or cutting operation.

In other exemplary embodiments, a plurality of sensors/switches (contact or non-contact) can be placed on each surface 107A/B to allow for the placement and sensing of different workpieces, having different configurations. That is, a first switch/sensor (or group of switches/sensors which can be contact or non-contact) can be used to sense a first type of workpiece having a first set of characteristics (shape, size, etc.) such that when the first switch/sensor(s) are engaged the controller 115 recognizes that a first workpiece is placed on a surface 107A/B. Thus, the controller 115 provides the proper instructions to the robot 105 for the first workpiece. The surfaces 107A/B also have a second switch/sensor (or group of sensors/switches which can be contact or non-contact) which, when engaged, indicate that a second workpiece which is different than the first workpiece is placed on a surface 107A/B. Thus, the controller 115 then recognizes that the second type of workpiece has been placed on the surface 107A/B and instructs the robot 105 accordingly. Such embodiments can increase the flexibility of the system 100, by allowing for the system 100 to be used on multiple types of workpieces having different characteristics, while minimizing the chance for errors or requiring user input for each different workpiece. For example, some exemplary embodiments can use pressure switches which sense the amount of pressure or weight being applied and inform the controller 115 of the sensed pressure/weight to determine which workpiece has been installed. Other embodiments can use switches/sensors (contact or non-contact) placed at preselected locations on the surfaces 107A/B (as described above) and the combination of switches/sensors being engaged informs the controller 115 which workpiece or type of workpiece has been placed on the surface 107A/B. Other embodiments, which use a sensing current to determine the presence of a workpiece, can use the detected resistance of the workpiece to determine which type of workpiece is placed in the work zone.

It should also be noted that the depiction of the manifold 104, duct system 103 and fume extraction device 101 in the figures are intended to be exemplary, as various other configurations can be utilized without departing from the spirit or scope of the present invention. For example, as shown in FIG. 1 the fume extraction device 101 is positioned remotely from the assembly 110 and can be positioned outside of any protective barrier (not shown) used to protect the work area around the assembly 101. However, in other exemplary embodiments the device 101 and duct system 103 can be formed as an integral unit within a single housing which houses the motor 108, manifold 104, etc. That is, in some embodiments, a single housing can be positioned below the assembly 110 which houses the device 101, duct system 103, manifold 104, motor 108, and a controller 115 to make a single compact integral unit.

Figure 6A:
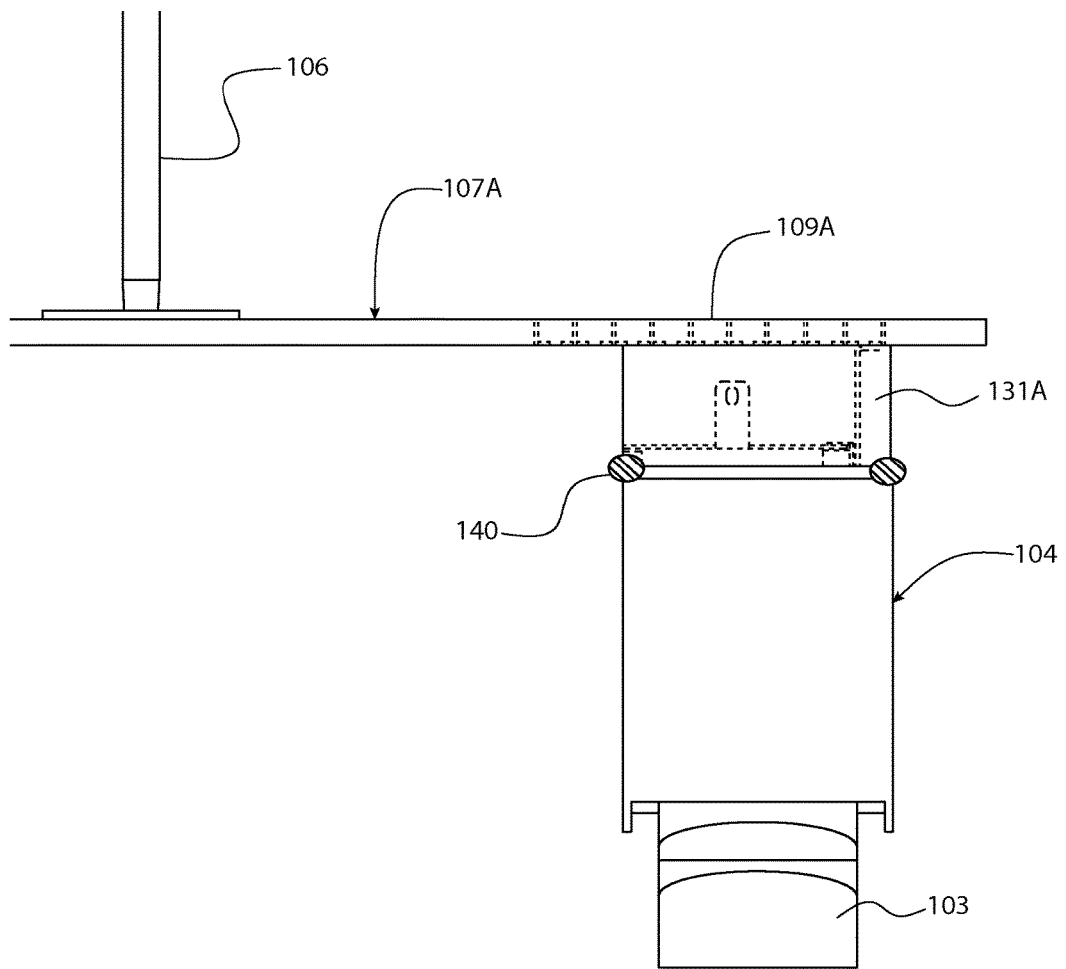
FIGS. 6A to 6C illustrate exemplary embodiments of a seal engagement between a manifold and ventilation ports on the moveable assembly.
Figure 6B:
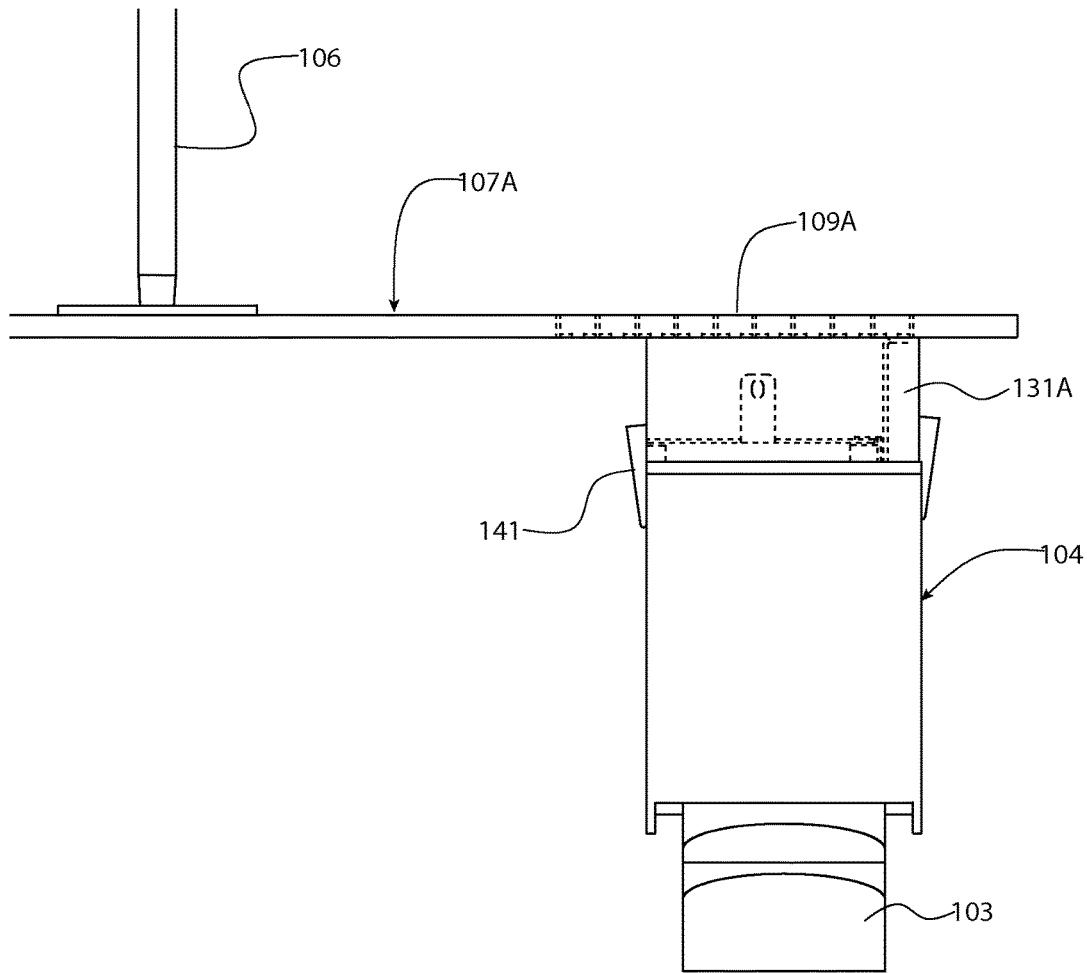
Figure 6C:
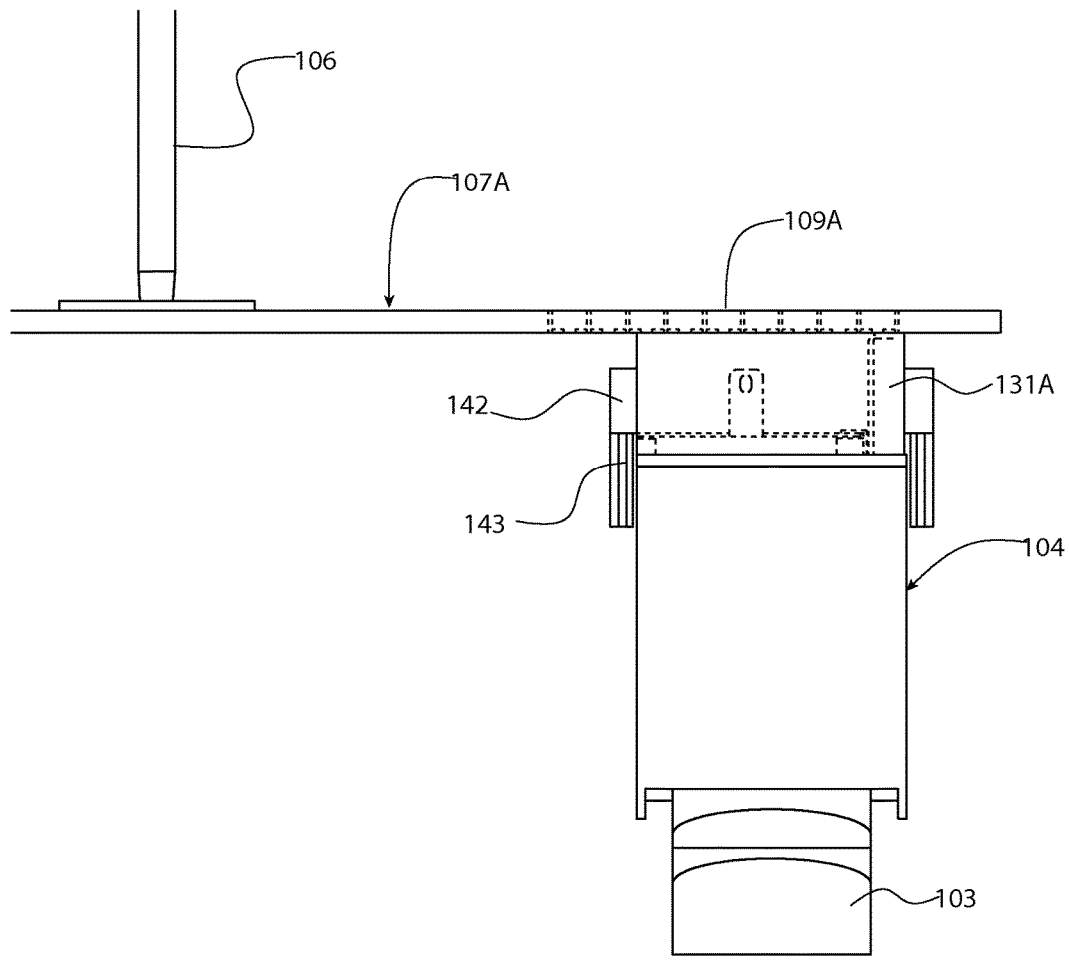

As described above, in some embodiments a gap G can exist between the stationary manifold 104 and the ports 109A/B or extensions 131A/B to allow for easy movement of the assembly 110 while still allowing for adequate ventilation. FIGS. 6A through 6C depict other exemplary embodiments in which a sealing engagement exists between the assembly 110 and the manifold 104. In FIGS. 6A and 6B a flexible seal 140/141 is secured to the extension 131A which provides a sealed engagement between the manifold 104 and the extensions 131A/B when positioned appropriately as described above. These flexible seals can be made from any flexible material, such as rubber or neoprene, etc. that will allow for movement of the assembly 110 while also provide a sealed engagement to further enhance ventilation. FIG. 6A depicts a rounded seal 140, while FIG. 6B depicts a blade type seal 141. While the seals are shown to be secured to the extensions 131A/B in FIGS. 6A and 6B, they can be secured to the manifold 104, if desired. During operation, when the assembly 110 is properly positioned, after movement, the seal 140/141 covers at least the majority of the gap G to enhance air flow through the ports 109A/B. In some embodiments, the seal 140/141 is in a compressed or deflected state when the assembly 110 is properly positioned to enhance the sealing of the gap G. FIG. 6C depicts another exemplary embodiment where the gap G is bridged by bristles 143 secured with a bristle engagement 142 to either the extension 131A/B or the manifold 104. However, in other embodiments, the bristles 143 may be attached to other nearby structure, e.g. work surfaces 107A/B. The bristles 143 can be made of any flexible material which enhances air flow through the ports 109A/B and provides flexibility to allow the assembly 110 to move as desired. It is noted that embodiments of the present invention do not require the sealing mechanism 140/141/143 to provide an "air tight" seal, but that they aid preventing excessive air flow through the gap G so as to enhance the downdraft ventilation through the ports. In some embodiments, the bristles themselves may serve as the extension 131A/B, i.e. no separate extension 131A/B needed. In this case, the bristles may be longer than the ones shown in FIG. 6C.

In other exemplary embodiments, a plurality of movable flaps or other components can be placed on either the extensions 131A/B or the manifold 104 which can be actuated/moved to be retracted when the assembly 110 is to be moved, and then moved to cover the gap G when the assembly 110 is moved to a work position. Such an embodiment can aid in making a tighter closing of the gap G to optimize air flow. In other exemplary embodiments, the duct system 103 has a flexible portion to allow the manifold 104 to be moved upward and downward by an actuator, where the actuator moves the manifold 104 up to engage the extensions 131A/B or ports 109A/B when the assembly 110 is moved into its working position, and then the manifold 104 is retracted before the assembly 110 is moved after work completion. In such embodiments, the movement/actuation of the flaps and/or manifold 104 can be controlled by the controller 115.

In further exemplary embodiments, a damper (or dampers) can be installed in the manifold 104 and/or the duct system 103 to control or regulate the ventilation flow. For example, the damper(s) can be used to ensure evenly distributed flow rates over the area of the ports 109A/B. Further, the damper(s) can be controlled either manually or by the controller to control ventilation based on the workpiece. For example, it may be desirable to focus the downdraft ventilation to one region of the port 109A/B depending on the workpiece and as such the damper(s) can be used to control the ventilation flow accordingly. In some exemplary embodiments the damper(s) can be positioned in the manifold 104, while in others the damper(s) can be positioned in the duct system 103, for example, just below the manifold 104.

In the exemplary embodiments described above, the ventilation ports 109A/B are positioned in each respective surface 107A/B. However, in other embodiments, one or more ventilation ports may be provided in one or more dividers (e.g. center divider 106) in addition to the ventilation ports 109A/B. In this way, not only downdraft ventilation via the ventilation ports 109A/B, but also backward draft ventilation via the ventilation port(s) positioned in the divider(s) can be achieved, thereby increasing source capture capacity. In this case, a divider whose width is broader than that of the center divider 106 shown in FIG. 1 may be used to include a ventilation port(s) therein. Further, in some embodiments, only backward draft ventilation (or to-side ventilation) may be used without downdraft ventilation.

In the embodiments utilizing backward draft (or to-side) ventilation, the ventilation port in a divider may utilize a support vent structure similar to the support vent structure 130A/B described above. Thus, this support structure may be a rigid structure that sits planar with or is incorporated into the divider wall surface. This support vent structure may be a grate-like structure such that undesirable foreign items are prevented from entering into the ventilation system 100.

In some embodiments, a replaceable pre-filter or spark arrestor (e.g. metallic assembly) may be provided, e.g. beneath or behind the surface of the ventilation port and support vent structure. The replaceable pre-filter or spark arrestor can help prevent smaller, foreign or undesirable items from entering into the ventilation system that would have otherwise been able to pass through a coarse grate (i.e. support vent structure). In some specific cases, the pre-filter and spark arrestor may be integrated into a singular component that serves both functions concurrently. For welding applications that emit sparks, molten weld spatter, embers, or fragments of weld slag, the spark arrestor can help prevent these hot items from being carried back to the ventilation system filter element.

According to another embodiment of the invention, shown in FIGS. 7-14, a workpiece positioning system 200 is provided. Workpiece positioning system 200 differs from the first embodiment in that suction for fume removal is applied through the divider rather than the table surface. This increases the usable space on the table for mounting the work piece and provides increased flexibility in terms of working on the table and supporting the workpiece W.

As in the previous embodiment, system 200 includes a fume extraction device 201 that creates a suction or negative pressure flow at the work zone WZ through a duct system 203. Fume extraction device or simply fume extractor 201 may include an extraction motor 202 that drives an impeller, fan, bellows, flapper, venturi generator or other device capable of providing the necessary negative pressure or flow away from the work zone WZ to extract fume. A filter 214 may be provided to scrub the extracted air and remove any undesirable particulate, chemicals, fume etc. from the drawn air flow.

The system 200 further may include a robot 205 to perform the desired welding operation. As discussed above movement of robot 205 may be coordinated with operation of the workpiece positioning system 200.

Figure 7:
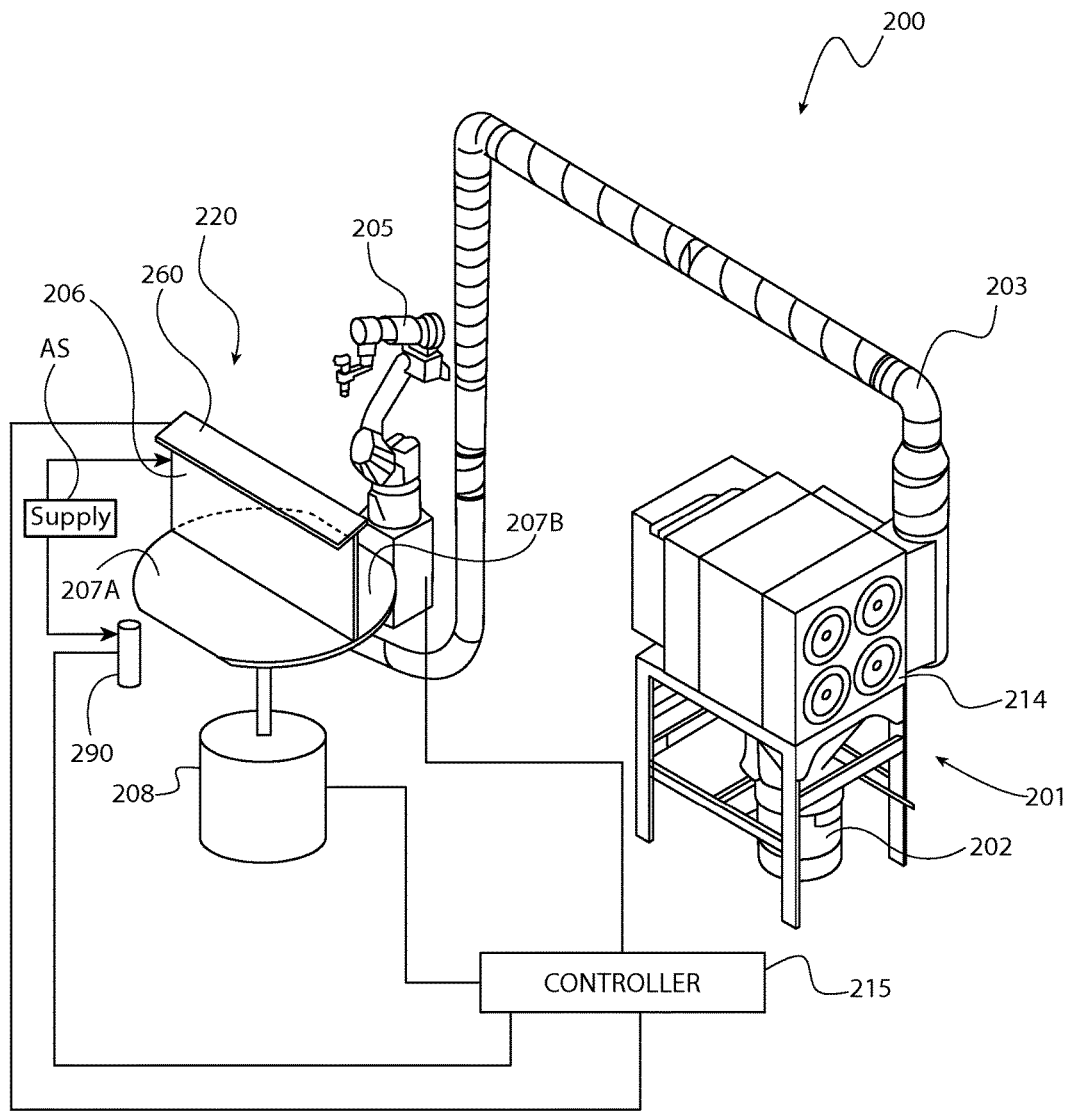
FIG. 7 illustrates an exemplary embodiment of an integrated fume extraction system in accordance with an exemplary embodiment of the present invention.
Figure 8:
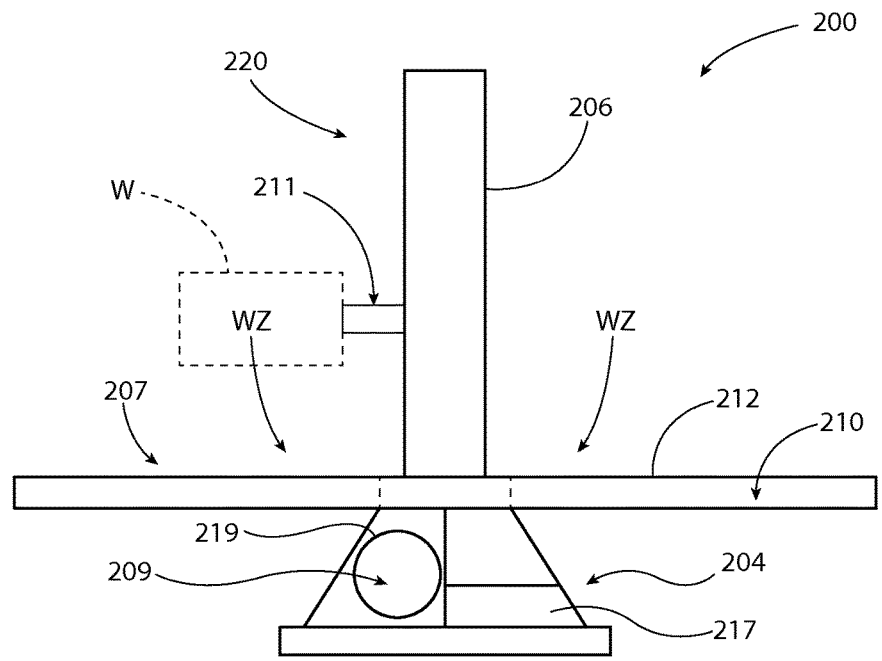
FIG. 8 is a side elevational view of a workpiece positioning system according to the invention.
Figure 11:
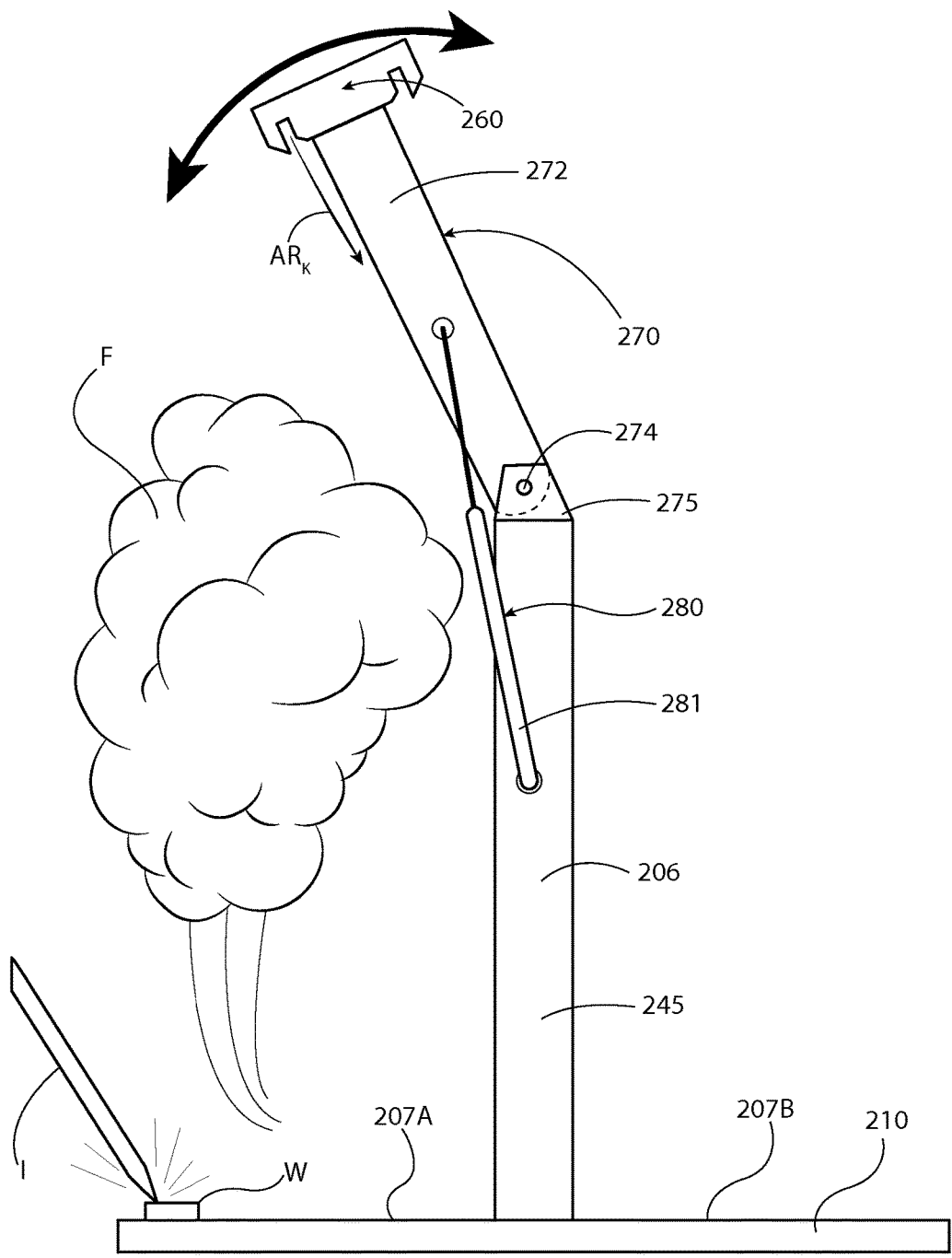
FIG. 11 is a side elevational view of a workpiece positioning system according to the invention showing details of an air knife assembly.

With reference to FIG. 7 or 11, system 200 includes a workpiece surface or table 210 that provides a supporting surface 207 on which a workpiece W may be placed during a welding operation. Table 210 may include fixtures 211 that help position the workpiece W. These fixtures 211 may simply restrict movement of workpiece W or may attach workpiece W to table 210. Also, fixtures 211 may be used support workpiece W in a suspended position above table 210. To that end, fixtures 211 may attach to table 210 (FIG. 12) or a secondary surface near the table 210. For example as shown in FIG. 8, divider 206 may be used to support a fixture or directly support workpiece W. While the table 210 shown has a generally horizontal configuration with a flat work surface 207, other configurations may be used including but not limited to upward or downwardly sloped, curved, or other configurations. Likewise, a variety of surface configurations that incorporate sloped or curved surfaces within the table may be used. As discussed above, table 210 includes a divider 206 to define plural work zones WZ. In the example shown in FIG. 8, divider 206 is a single member that extends upward relative to a top surface 212 of table 210. Divider 206 in this example forms two work zones WZ on either side of divider 206. In other embodiments, divider may include multiple members that define more than two work zones.

Workpiece positioning system 200 rotates to index the plural work zones relative to a point of reference. For example, welder robot 205 may provide one point of reference such that in a first rotational position, workpiece positioning system 200 locates a first work zone $WZ_1$ adjacent to robot 205 and may be rotated to a second rotational position where a second work zone $WZ_2$ is adjacent to robot 205. Additional work zones and positions may be provided allowing with the indexing being performed by varying the amount of rotation. In the example shown, only two rotational positions are provided to accommodate two work zones. The first and second work zones $WZ_1$, $WZ_2$ are separated by a single vertical divider 206 that is located in the center of table 210 to equally divide the table 210. Thus, indexing between the first and second positions requires 180 degrees of rotation. Additional work zones or work zones of unequal size may vary the amount of rotation needed to align the work zone with the welder for performance of the welding operation.

Rotation of table 210 may be accomplished in any known manner including but not limited to mounting table 210 on a spindle, supporting the table on bearings, and the like. A motor 208 (FIG. 7) is provided to rotate table 210 in the example shown, but table 210 may be rotated manually. In the example shown, motor 208 is in communication with a controller 215 that controls movement of table 210. Controller 215 may also control a robot 205 performing the welding operation such that the operation of the robot 205 and motor 208 may be coordinated by controller 215. For example, controller 215 may cause assembly 210 to rotate an appropriate distance to position a workpiece in one of the work zones in a position for robot 205 to perform the welding operation. Upon completion of the welding operation, controller 215 may then stop operation of robot 205 and rotate assembly 210 to move the completed workpiece away from robot 205 and index the workpiece in another workzone into registry with robot 215.

The assembly 210 shown is divided into multiple work zones (two shown) where the first work zone $WZ_1$ has a first work surface 207A and the second work zone $WZ_2$ has a second work surface 207B, each of which can support, separately, a workpiece W for a welding operation. The work zones are separated by divider 206 which provides protection between the two work zones. As shown, the divider 206 may be centered between work zones. Alternatively, divider 206 may unequally divide the work zones to form work zones of different sizes relative to each other. Divider 206 shields each respective work zone from the other preventing debris or sparks from traveling from one zone to the other and protecting a user on one side from the welding operation on the other side of divider 206.

A collector assembly, generally indicated by the number 220, in fluid communication with extractor 201 is provided on table 210 to extract fume F during the welding operation. Collector assembly 220 extends from table 210 to allow the table surface to be used for mounting the workpiece. In the example shown, collector assembly 220 is formed as part of divider 206. It will be understood that collector assembly 220 may include other structures supported on the table 210 separate from divider 206 to perform fume extraction.

A manifold, generally indicated at 204, may be provided to fluidly connect collector assembly 220 to duct 203. As mentioned, in the example shown, collector assembly 220 is formed as part of divider 206, and for sake of simplicity, discussion will proceed with reference to the divider. It will be understood that the structures provided within divider to perform fume extraction could be provided on a separate collector assembly as well. Divider 206 defines at least one channel 225 that fluidly connects to manifold 204 and in turn, the fume extractor 201. To extract fume from a work zone, divider 206 defines at least one ventilation port 230 that is open to the atmosphere adjacent to a work zone. In the given example, divider 206 includes a first surface 206A facing first work zone WZ1 and a second surface 206B facing second work zone WZ2. Ventilation port 230 may be formed in any surface of divider 206 where fume extraction is desired. In the example shown, first and second surfaces each include at least one ventilation port 230 for the extraction of fume from the adjacent work zones. It will be understood that in other arrangements where multiple dividers are used to define adjacent work zones, only one surface may need to have an opening to accomplish fume extraction.

Ventilation port 230 may have any shape or form. In the example shown, ventilation port 230 is in the form of a slot having a width similar to the width of divider 206 and a height that is less than the width. The divider 206 shown includes a first slot 231 near the base of the divider with additional slots formed in the divider 206 above first slot 231. To attempt to equalize the pressure drop across each slot, the area of each slot 231 may be increased in proportion to the distance of the slot from the surface of table 210. For example, first slot 231, which is nearest to table 210 has a first area A1, second slot 232 has a second area A2 and so on to a slot that is furthest from the table or the source of suction. This slot is referred to herein as slot n, and referred to with a subscript n. Slot $231_n$ is the furthest from the table 210, i.e. where the source of suction is connected by manifold 204, in the depicted example. The area of each slot increases such that second area A2 is greater than first area A1. Slot 233 has an area A3 greater than the area A2 of slot 232. Area An of slot $231_n$ is greater than the area of the slot that proceeds it, which in the example shown is slot 233. It will be understood that other variations in the area may be used tailor the pressure drop at each ventilation port 230 including but not limited to using slots of equal area or using slots that have an area that decreases in proportion to the distance from the table. Alternatively, slots of irregular area may be used relative to their distance from table 210 to achieve higher or lower pressure drops at desired locations. Likewise the shape of the ventilation port 230 may vary across the width to tailor the pressure drop in this direction.

According to another embodiment, the openings 230 within collector assembly may be made variable to allow adjustment of the openings 230 at set up or in an automated fashion during the process. For example, as shown in FIG. 10B, divider 206 may include a cover that may be used to adjust the size of any opening. Cover may include any member or assembly that adjusts the size of the opening by selectively opening or closing off a portion of the opening to the flow of air. For example, as shown, cover 235 may include a louver that pivots to adjust the area of the ventilation port 230 available for air flow. Louver 236 may be pivotally mounted on divider 206 and rotate from a closed position where the louver 236 covers or fills ventilation port 230 to an open position where the opening is substantially uncovered or completely uncovered by louver 236. The louver 236 may assume intermediate positions to adjust the size of the opening between the fully open and fully closed positions. Other arrangements may use covers that slide, contract, or otherwise move to cover and uncover the opening. Automatic adjustment of the opening area may be accomplished by connecting a cover actuator to cover 235 and to controller 215 allowing controller 215 to selectively expand or contract the area of opening(s) 230.

Openings 230 may be separated from each other by slats 242 or other members. Slats 242 may be attached to divider 206 at the edges of divider 206 or supported on members extending from other portions of divider 206. In the example shown, divider 206 includes openings on both sides 206A, 206B so that divider may act as a fume collector for each work zone. Divider 206 has a box like structure with a top 241, a bottom 243, and a center panel 244 extending between the top and bottom. Sides 245 may also connect the top and bottom surfaces. Slats 242 extend between the sides 245 and are spaced outward from center panel 244 to define a first channel 251 on a first side and a second channel 252 on a second side of divider 206. A reinforcing rib or plural reinforcing posts 243 or other members may extend from center panel 244 to provide additional support for the slats 242. As discussed, slats 242 are spaced from each other to form openings 230 to draw in air from each work zone. In the example shown, the positioning of slats 242 relative to center panel 244 is symmetrical such that each channel 251,252 has the same configuration. Non-symmetrical configurations may also be used.

In some embodiments, a replaceable pre-filter or spark arrestor (e.g. metallic assembly) may be provided, e.g. beneath or behind the surface of the ventilation port 230. For example, pre-filter 228 (shown schematically in FIG. 14) may located at the base of each channel 251,252 and may be set within a recess in the table 210 such that divider 206 is mounted thereon. The replaceable pre-filter or spark arrestor 228 can help prevent smaller, foreign or undesirable items from entering into the ventilation system that would have otherwise been able to pass through a coarse grate (i.e. support vent structure). In some specific cases, the pre-filter and spark arrestor may be integrated into a singular component that serves both functions concurrently. For welding operations that emit sparks, molten metal, embers, or fragments of slag, the spark arrestor can help prevent these hot items from being carried back to the ventilation system filter element 214.

Each channel 251,252 has its own extraction port 255 that communicates with manifold 204 such that communication between fume extractor is limited to one side of divider 206 at a time. Extraction port 255 is any opening that provides fluid communication between manifold 204 and openings 230, and may simply include an open end of divider 206 as shown. As best shown in FIGS. 7 and 8, manifold 204 includes a first section 204A and second section 204B, where first section 204A is fluidly connected to first channel 251 and second section 204B is connected to second channel 252. Each channel includes an extraction port 255 formed at the open bottom end of divider 206. The center wall 244 of divider separates extraction ports 255 from each other to allow air to be drawn through openings 230 on one side of divider 206 at a time.

Figure 9:
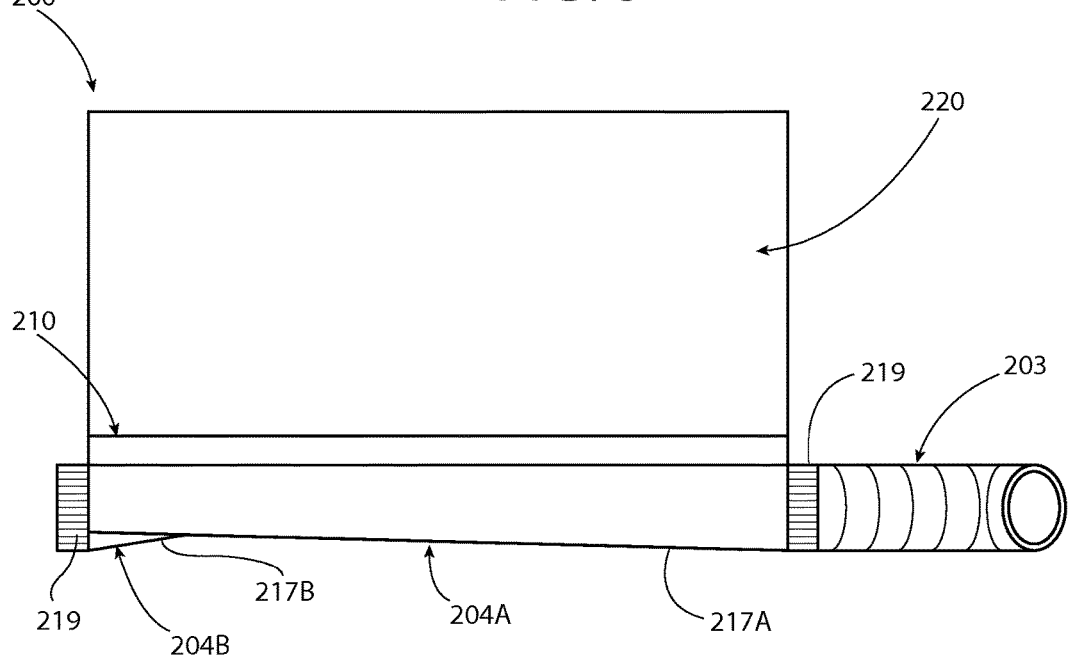
FIG. 9 is a front elevational view thereof.
Figure 10:
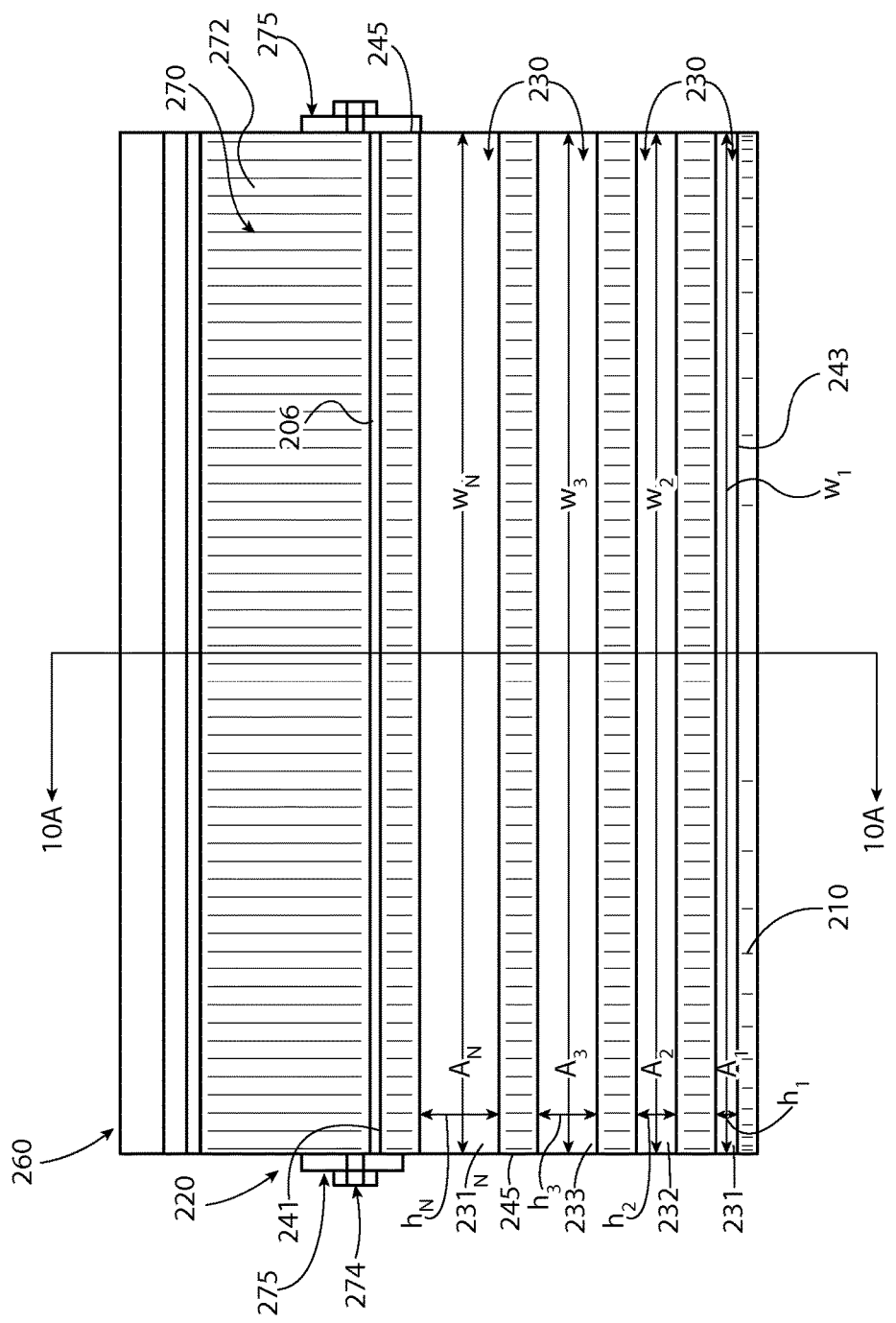
FIG. 10 is a front elevational view of a collection assembly according to the invention.

In the example shown, control of the suction to one channel at a time is performed by selectively connecting a manifold section corresponding to each channel 251, 252 as described below. It will be understood that other methods of selectively controlling the flow to one or more of the channels may be accomplished by a suitable valve or similar device. With reference to FIGS. 8 and 9, an inlet 209 is provided at one end of each section 204A,204B. The manifold narrows away from the inlet 209 to maintain a near equal pressure across the width of manifold section 204. In the example shown, a linear reduction in cross-sectional area is made by providing a lower surface that linearly slopes upward as it extends away from inlet 209. A sidewall of the manifold may slope inward from the lower surface of manifold section toward port 255. In the example shown, inlets 209 for each section 204A,204B are located on opposite sides of table 210 below divider 206. An end of duct extends horizontally toward table 210. Inlet 209 may be an opening or nozzle that is oriented to align with the end of duct 203. A flexible seal may extend outward from inlet 209 to engage duct 203 as the inlet is rotated into alignment with duct 203. Flexible seal 219 may include but is not limited to an annular row of brushes or rubber cylinder that receives the end of duct 203 therein. Fluid communication with one work zone is created when the work zone is rotated to place the work piece W in front of robot 205 by aligning the inlet 209 with duct to create fluid communication therewith. In other words, the fluid communication between fume extractor and openings 230 is selected so that extraction occurs at one of the work zones. In arrangements where more than two work zones are used or if an arrangement would including welding operations at all of the work zones defined by the divider 206, fluid communication may be established to multiple work zones simultaneously by fluidly connecting more than one channel to the fume extractor.

According to another embodiment of the invention, an air knife assembly, generally indicated by the number 260 in FIGS. 10-13 may be provided to provide a positive pressure to direct fume or debris created by the welding operation to a desired area. In the example shown, air knife assembly is provided above table 210 to direct a positive pressure above the work zone WZ. The positive pressure above the work zone contains the fume F and debris within the work zone and may be arranged to direct the fume toward divider 206 so that it may be extracted by the collection assembly 220. Air knife assembly 260 generally includes an opening 262 that is fluidly connected to a fluid source (FIG. 10A) that provides a positive pressure flow $AR_K$ out of the opening 262. The opening 262 may be configured to distribute the air flow in a desired shape or direction depending on the particular application of the positive pressure. For example a circular opening may be used to generate a conically shaped flow or a flattened opening or slot may be used to provide a flattened flow. In the example shown, air knife assembly 260 includes an air knife 261 supported on each side of divider 206 above the work zone. The air knife 261 is a hollow body having an inlet that connects to an fluid supply, which in the example is an air supply AS (FIG. 7). A conduit C may extend upward from a union in the center of table 210 and split to extend upward through divider 206 to supply air to each air knife. As shown in FIG. 10A, a first conduit $C_A$ may supply a first air knife 261A and a second conduit $C_B$ may supply a second air knife 26. The body further defines a passage, which terminates in a flattened opening 262 where the width of the opening is greater than its height to form a flattened flow of fluid. The upper and lower walls 263,265 forming opening 262 slope inward toward opening 262. The inward slope of these walls and flow of air from opening 262 combine to draw surrounding air from above the air knife to join the forward flow from opening 262. Air supply AS may be a pump, pressurized cylinder, or the like that may selectively provide a flow of air to air knife 261. The air knife 261 may direct a flow of air outward relative to divider 206 to contain fume, which typically rises on a convection current, so that the negative pressure flow created at the collection assembly extracts the fume from the work zone. Or, as shown, air knife may direct a flow of air downward parallel to the surface of divider 206 to force fume toward the openings in divider 206 for extraction. It will be understood that the downward flow of air parallel to divider 206 may be used to create a venture effect to draw fume F downward and toward divider 206 for extraction.

As shown in FIG. 11, air knife assembly 260 may be mounted on a manipulator 270 that allows the position of the air knife assembly 260 to be adjusted. Manipulator 270 may be any member that can support air knife and move to change the position of the air knife 261. In the example shown, manipulator is a panel 272 that is pivotally attached at 274 to the top of divider 206 by a pair of brackets 275 located at the top of divider 206. Use of the panel 272 provides a further barrier to the updraft of fume created by the welding operation and helps direct the fume toward the air knife mounted on the end of the panel 272. During a welding operation, panel 272 is tilted outward at an angle relative to divider 206 to place the air knife over the work zone and outward of the divider 206. In some applications, this position may be inconvenient for setup or loading operations, and thus, panel 272 may be retracted to a position where it is aligned with the divider 206 when air knife 260 is not in use or when the airflow emanating from air knife 260 in this position is sufficient to contain the fume for extraction. To facilitate this movement, an air knife actuator 280 may be provided as shown in FIG. 11. Actuator 280 may be a fluid cylinder, linkage, motor, or other implement that assists the user in moving the air knife panel manually or is capable of automatically moving the air knife panel in response to input from a user or controller 215. In the example shown, an automatic cylinder 280 extends between the top of divider 206 and air knife panel. Cylinder is connected to controller 215 and receives commands from controller 215 to move the air knife panel 272 as desired based on the welding operation. To that end, controller 215 may move air knife panel 272 to an upright position where the panel is aligned with divider 206 to facilitate loading or unloading of the workpiece, initial movement of the robot 205, or other task that requires greater headroom over the work zone. Likewise, controller 215 may signal actuator 280 to move air knife panel to any position outward of divider 206. A fume sensor in the work zone may communicate with controller 215 to provide feedback for movement of the air knife to reposition the air knife to obtain more efficient fume extraction. For example, extending the air knife outward from panel and directing its flow downward by pivoting air knife panel may direct the fume toward divider where it will be extracted through openings 230.

Figure 14:
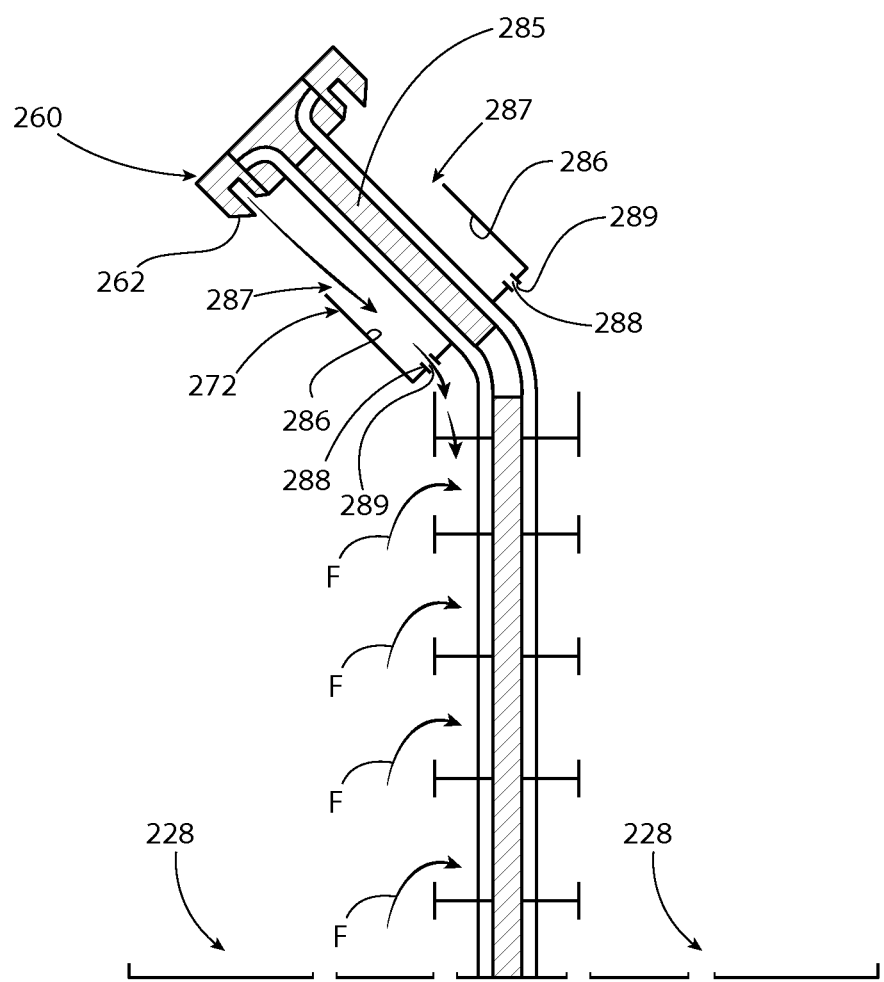
FIG. 14 is a sectional side view similar to FIG. 10A showing details of an alternative divider in the workpiece positioning system.

As best shown in FIG. 14, as a further alternative, panel 272 may be fluidly connected to divider 206 to channel fume through panel 272 for extraction at divider 206. As shown, panel 272 may have a structure similar to divider in that it is provided with a center panel 285 located between face members to form first and second panel channels 286 on each side. The channels open at an inlet 287 adjacent to air knife assembly such that air knife may direct fume F into a panel channel 286. The base 288 of panel 272 defines at least one opening 289 that communicates with divider 206 to direct fume from the panel channel 286 to channel within divider 206. The downward air flow from air knife may travel downward through panel opening 289 into divider 206 to assist the evacuation assembly by pushing fume downward within the channel where the strongest suction is present. In this embodiment, air knife is positioned adjacent to the center panel of panel 272 and the opening 262 of air knife is oriented to direct an air flow parallel to the center panel 285. In addition to directing air toward opening 289 in base 288 of panel 272, the air flow from air knife 261 creates a venture effect that draws fume into inlet 287 for extraction.

Figure 12:
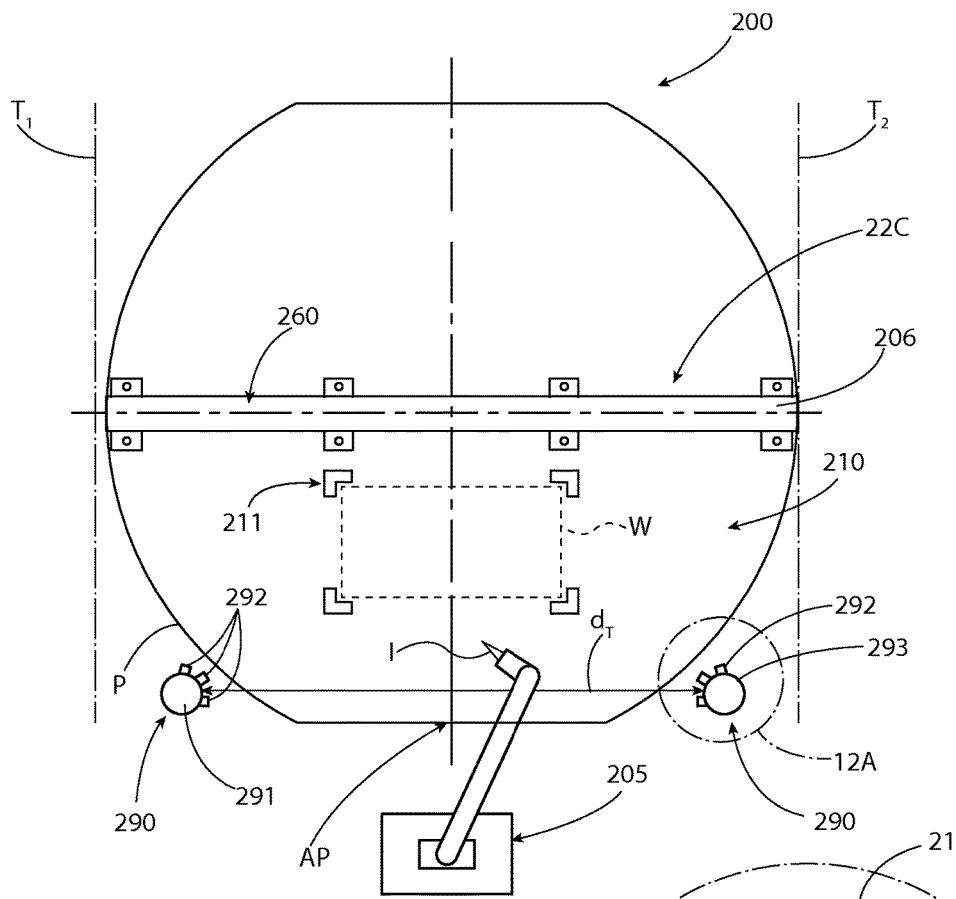
FIG. 12 is a top plan view of a workpiece positioning system according to the invention showing details of an air tree assembly.
Figure 12A:
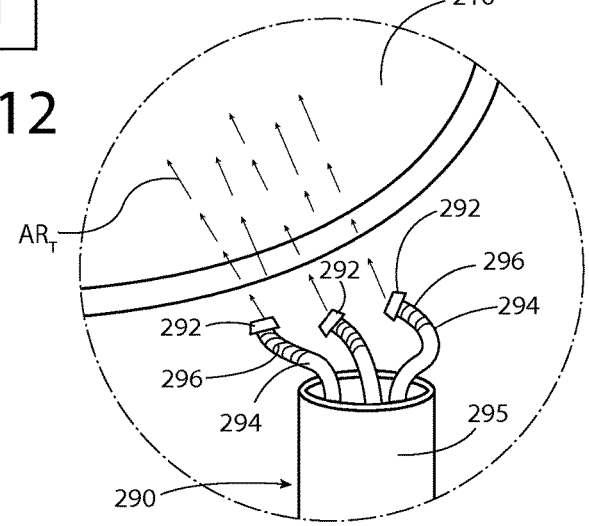
FIG. 12A is an enlarged view of an area indicated in FIG. 12 showing additional details of an air tree assembly.
Figure 13:
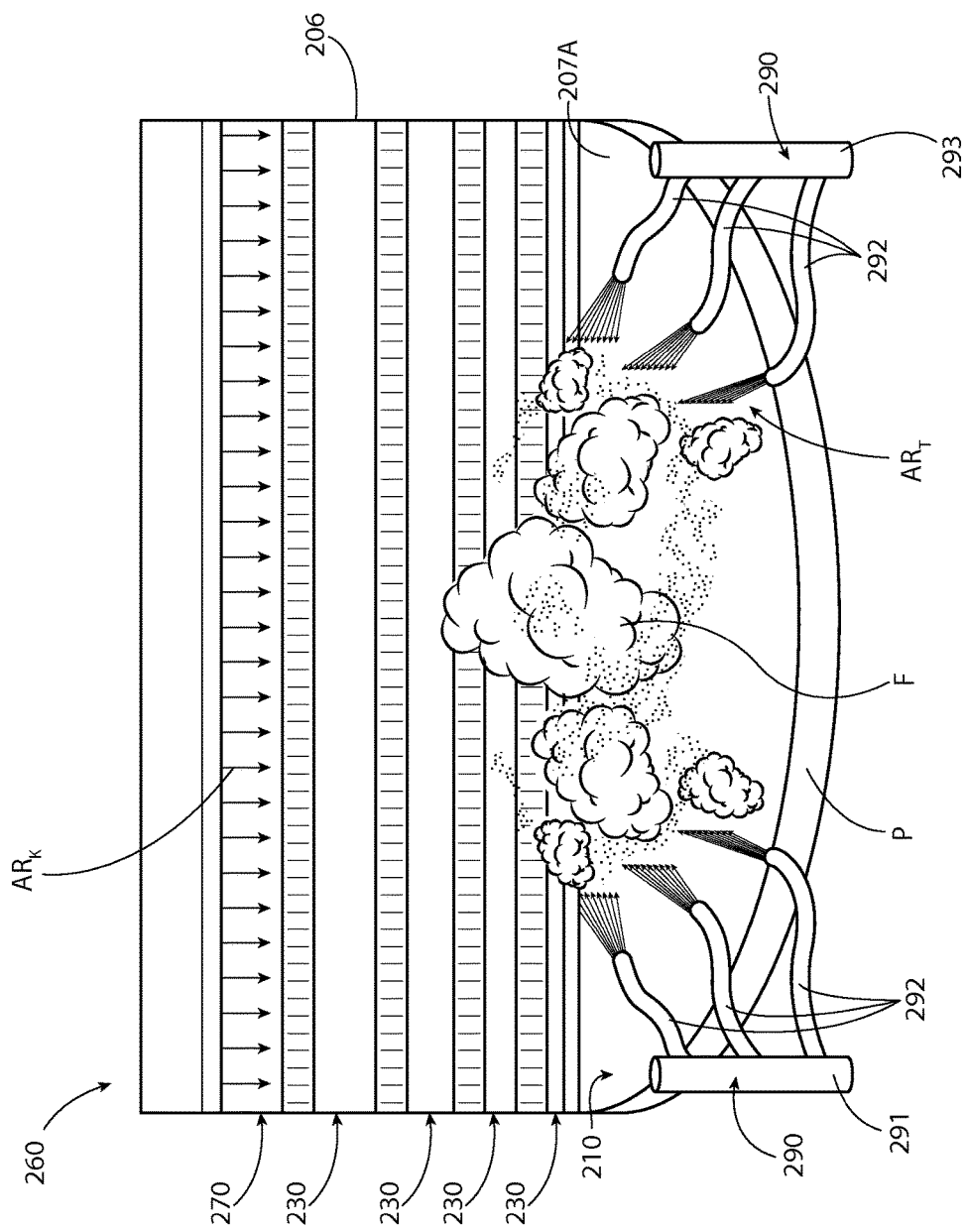
FIG. 13 is a perspective view of a workpiece positioning system according to an embodiment of the invention showing operation of an air tree assembly.

Additional fume management systems may be used to contain and/or direct the fume for extraction. FIG. 12 shows an air tree, generally indicated by the number 290, positioned at a perimeter P of the work zone with at least one nozzle 292 that directs a flow of fluid, such as air, inward toward divider 206. Like air knife, the air tree provides a positive pressure source to contain or redirect fume or debris from welding operation. Air tree may include one or more nozzles 292 connected to a positive pressure source, such as air supply AS, and selectively activated to provide the desired positive pressure $AR_T$. The nozzles 292 may be adjustable to allow the user to tailor the direction of the flow $AR_T$. Also, the nozzles may have an opening adjuster that allows the size and shape of the flow to be adjusted. In the example shown, nozzles 292 are provided on flexible hoses 294 mounted supported within a cylindrical trunk 295. Hoses 294 may include a fixation element 296 that is deformable but holds its shape to manipulate the nozzle 292 and hold it in a desired position. The fixation element may be provided within or as part of hose 294. In the example shown, fixation element 296 includes a metal coil mounted on the end of hose 294.

Positioning of the air trees about the work zone may be selected based on the size and shape of the assembly 210 and the volume of where the fume is to be contained and collected. The air tree may be provided on the movable work surface and rotate therewith, or as shown, they may be located off of the movable work surface and be stationary. In the example shown, a first air tree 291 is provided on one side of table 210 at its perimeter P and a second air tree 293 is laterally spaced from the first air tree a distance $d_T$ and located on an opposite side of the table. The air trees are stationary such that the movable work surface is rotated to place a work piece W between the air trees 291,293. When a circular table is used, as shown, first and second air trees may be located radially inward of tangent lines $T_1$ and $T_2$ passing through the sides of the divider 206 and an apex AP of the table located at a center line extending perpendicular to the plane of the divider 206. The lateral spacing $D_T$ of the first tree and second tree define a clearance for operation of the welder. In the example shown, first tree and second tree have nozzles located above the surface of the table to direct a flow of air inward toward divider 206. It will be understood that nozzles could be located at the level of the table or below the table and directed upward and inward to increase the clearance for the welder. This location may be less efficient in terms of directing the flow but suitable. The nozzles shown are on adjustable stalks that allow each nozzle to be manipulated in three dimensions to direct the flow of air from each nozzle as desired. It will be understood that compromises between efficient fume extraction and the air flow from the nozzle's interference with the welding operation may need to be made. For example, if the welding operation includes a shielding gas, the air flow from tree may need to be tailored to avoid interference with the shielding gas flow that might degrade the quality of the welding operation.

As best shown in FIG. 7, air knife assembly 260 and air tree assembly 290 may be fed by a common air supply AS. Alternatively, each may have an independent supply. As mentioned, air knife assembly 260 may be fluidly connected to air supply by a conduit C that connects to a union or other connection within the movable work surface assembly 210 such that the fluid communication is maintained regardless of the rotational position of the work surface assembly 210. Alternatively, as in the case of the connection between the ventilation ports and fume extraction device, manifold 204 may include additional sections or conduits that fluidly connect the air knife assembly to the air supply once the work surface assembly is rotated to a desired position. For example in a two work zone assembly 210, as shown, first conduit $C_A$ may have a port within a that aligns with an air supply hose when the first work zone is in use and a second conduit CB may have a port diametrically opposite to first conduit port that aligns with an air supply when second work zone is in use. When air tree is incorporated on the table manifold 204 may include additional sections or conduits to selectively provide air from the air supply AS to the air knife assembly and air tree assembly in an active work zone as well.

It will be understood that a combination of fume extraction through the table and divider may be accomplished by providing a manifold that connects to extraction ports in the table and in the divider to simultaneously apply a suction at both locations.

While the described subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed:

1. A workpiece positioning system integrated with a fume extraction device, the system comprising:
    a rotatably movable work surface assembly including at least one work surface;
    at least one divider extending upward from the at least one work surface dividing the at least one work surface into a plurality of work zones in which a welding operation is performed, the divider including a collection assembly comprising a first ventilation port on a first side of the divider opening toward a first work zone of the plurality of work zones and a second ventilation port on a second side of the divider opening toward a second work zone of the plurality of work zones formed by the divider; wherein at least one of the first and second ventilation ports are selectively placed in fluid communication with the fume extraction device to draw fume from at least one of the plurality of work zones;
    a robot adapted to perform a welding operation; and
    a controller in communication with the robot and the rotatably movable work surface assembly, wherein the controller coordinates movement between the robot and the rotatably movable work surface assembly.

2. The system of claim 1, wherein the first ventilation port includes plural openings formed in the divider and vertically spaced from each other wherein each opening has an area and wherein the area of each opening increases in proportion to its distance from the work surface.

3. The system of claim 1, further comprising a cover over the ventilation port, wherein the cover is movable to control an amount of extraction flow through the ventilation port.

4. The system of claim 3, wherein the cover is a louver pivotally mounted within the ventilation port.

5. The system of claim 1, wherein the work surface assembly rotates about a central axis and wherein the divider extends through the central axis of the work surface assembly and divides the work surface assembly into two equally sized work zones.

6. The system of claim 1, further comprising a manifold supported on the work surface assembly and rotatable therewith, the manifold including a first section fluidly connected to the first ventilation port and a second section fluidly connected to the second ventilation port, wherein each manifold section is separated from the other, and wherein the first manifold section defines a first extraction port at a first angular position and second manifold section defines a second extraction port at a second angular position.

7. A workpiece positioning system integrated with a fume extraction device, the system comprising:
    a rotatably movable work surface assembly including at least one work surface;
    at least one divider extending upward from the at least one work surface dividing the at least one work surface into a plurality of work zones in which a welding operation is performed, the divider including a collection assembly comprising a first ventilation port on a first side of the divider opening toward a first work zone of the plurality of work zones and a second ventilation port on a second side of the divider opening toward a second work zone of the plurality of work zones formed by the divider; wherein at least one of the first and second ventilation ports are selectively placed in fluid communication with the fume extraction device to draw fume from at least one of the plurality of work zones;
    a manifold supported on the work surface assembly and rotatable therewith, the manifold including a first section fluidly connected to the first ventilation port and a second section fluidly connected to the second ventilation port, wherein each manifold section is separated from the other, and wherein the first manifold section defines a first extraction port at a first angular position and second manifold section defines a second extraction port at a second angular position; and
    a duct extending from the fume extraction device, the duct being located adjacent to the work surface assembly, wherein the first extraction port is aligned with and in fluid communication with the duct when in the work surface assembly is in a first rotational position, and wherein the second extraction port is aligned with and in fluid communication with the duct when the work surface assembly is rotated to a second rotational position.

8. The system of claim 7, wherein the manifold is located below the work surface and the duct extends horizontally toward the manifold, each extraction port including a flexible seal extending outward therefrom to sealingly engage the duct when aligned therewith.

9. The system of claim 7, wherein each of the first manifold section and the second manifold section extend beneath the divider, and wherein each of the manifold sections define a volume, wherein the volume of each manifold section tapers inward as it extends away from the extraction port.

10. The system of claim 9, wherein each manifold section includes a floor that slopes upward as it extends outward relative to the extraction port.

11. The system of claim 1 further comprising an air knife assembly supported on the divider above the work surface assembly, the air knife assembly including an air knife defining an opening facing the work zone, wherein the air knife is connected to an air supply, wherein air from the air supply is selectively pumped out of the opening over the work zone.

12. A workpiece positioning system integrated with a fume extraction device, the system comprising:
a rotatably movable work surface assembly including at least one work surface;
a divider extending upward from the at least one work surface dividing the at least one work surface into a plurality of work zones in which a welding operation is performed, the divider including a collection assembly comprising a first ventilation port on a first side of the divider opening toward a first work zone of the plurality of work zones and a second ventilation port on a second side of the divider opening toward a second work zone of the plurality of work zones formed by the divider; wherein at least one of the first and second ventilation ports are selectively placed in fluid communication with the fume extraction device to draw fume from at least one of the plurality of work zones;
an air knife assembly supported on the divider above the work surface assembly, the air knife assembly including an air knife defining an opening facing the work zone, wherein the air knife is connected to an air supply, wherein air from the air supply is selectively pumped out of the opening over the work zone wherein the air knife assembly is supported on a manipulator attached to the divider, wherein the manipulator is movable to selectively position the air knife assembly.

13. The system of claim 12, wherein the manipulator includes a panel pivotally attached to the divider, the panel spacing the air knife from the divider and pivotable between a first position where the panel is aligned with the divider and a second position wherein the panel extends at an angle relative to the divider.

14. The system of claim 13 further comprising an actuator extending between the divider and the panel, wherein the actuator is movable to move the panel between the first position and the second position.

15. The system of claim 14, wherein actuator includes a fluid cylinder pivotally attached to the divider at one end and pivotally attached to the panel at a second end.

16. The system of claim 13, wherein the panel includes an inlet adjacent to the air knife, wherein the air knife is oriented to direct an air flow into the inlet and wherein the panel is in fluid communication with the extraction device.

17. The system of claim 1 further comprising an air tree assembly adjacent to the work surface assembly and including at least one nozzle fluidly connected to an air supply to selectively direct a flow of air toward the work surface assembly.

18. The system of claim 17, wherein the air tree assembly includes a first air tree and a second air tree, wherein the first air tree and second air tree are located outside the perimeter of the work surface opposite the divider, wherein each air tree includes at least one nozzle mounted on a flexible tube, wherein each tube includes a fixation element to permit adjustment of the nozzle position and hold a selected nozzle position.

19. A workpiece positioning system integrated with a fume extraction device, the system comprising:
a movable work surface assembly having a divider that defines a plurality of work zones, the work surface assembly including
a plurality of work surfaces on which workpieces are placed for a welding operation, and
a collection assembly defining a plurality of ventilation ports fluidly connected to the fume extraction device by a channel, each of the plurality of ventilation ports disposed adjacent to the plurality of work surfaces and selectively connected to the fume extraction device to ventilate a corresponding work zone; and
an air knife assembly supported on the divider, the air knife assembly including at least one air knife including an outlet in fluid communication with an air supply, the at least one outlet being oriented to direct fluid toward the at least one of the ventilation ports; and
a robot adapted to perform the welding operation and a controller in communication with the robot and the movable work surface assembly, wherein the controller coordinates movement between the robot and the movable work surface assembly.

20. A workpiece positioning system integrated with a fume extraction device, the system comprising:
a movable work surface assembly having a divider that defines a plurality of work zones, the work surface assembly including
a plurality of work surfaces on which workpieces are placed for a welding operation, and
a collection assembly defining a plurality of ventilation ports fluidly connected to the fume extraction device by a channel, each of the plurality of ventilation ports disposed adjacent to the plurality of work surfaces and selectively connected to the fume extraction device to ventilate a corresponding work zone; and
an air knife assembly supported on the divider, the air knife assembly including at least one air knife including an outlet in fluid communication with an air supply, the at least one outlet being oriented to direct fluid toward the at least one of the ventilation ports, wherein the air knife assembly is mounted on a manipulator supported on the divider, wherein the manipulator is movable between a position aligned with the divider and a position extending over at least one of the work zones.

21. The system of claim 20, wherein the manipulator includes a panel defining a panel channel therein, where the panel channel is fluidly connected to the channel within the divider by a panel opening, and wherein the panel defines an inlet adjacent to the air knife assembly, wherein the air knife assembly directs an air flow into the opening.

22. The system of claim 7, further comprising a robot adjacent to the work surface assembly and adapted to perform a welding operation within one of the plurality of work zones.

23. The system of claim 19, wherein the plurality of ventilation ports and the channel are incorporated in the divider.

24. The system of claim 19, further comprising an air tree supported adjacent to at least one work surface, the air tree including at least one nozzle connected to the air supply and adapted to direct air across toward the plurality of ventilation ports.

* * * * *